(12) United States Patent
Taniguchi

(10) Patent No.: US 9,604,670 B2
(45) Date of Patent: Mar. 28, 2017

(54) STEERING CONTROL DEVICE

(71) Applicant: Nissan Motor Co., Ltd., Yokohama-shi, Kanagawa (JP)

(72) Inventor: Hiroki Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 26 days.

(21) Appl. No.: 14/896,930

(22) PCT Filed: May 27, 2014

(86) PCT No.: PCT/JP2014/063906
§ 371 (c)(1),
(2) Date: Dec. 9, 2015

(87) PCT Pub. No.: WO2014/208248
PCT Pub. Date: Dec. 31, 2014

(65) Prior Publication Data
US 2016/0114832 A1    Apr. 28, 2016

(30) Foreign Application Priority Data

Jun. 28, 2013    (JP) ................. 2013-135729

(51) Int. Cl.
*B62D 15/02* (2006.01)
*B62D 6/04* (2006.01)
*B62D 6/00* (2006.01)

(52) U.S. Cl.
CPC ........... *B62D 15/025* (2013.01); *B62D 6/008* (2013.01); *B62D 6/04* (2013.01)

(58) Field of Classification Search
CPC ......... B62D 15/025; B62D 6/008; B62D 6/04
(Continued)

(56) References Cited

U.S. PATENT DOCUMENTS 6,134,491 A * 10/2000 Kawagoe ............. B62D 15/025
                                                              180/410
6,212,453 B1 * 4/2001 Kawagoe ............. B62D 5/0463
                                                              180/443
(Continued)

FOREIGN PATENT DOCUMENTS

JP    2001-48034 A    2/2001
JP    2006-264624 A   10/2006
(Continued)

*Primary Examiner* — Tyler J Lee
(74) *Attorney, Agent, or Firm* — Global IP Counselors, LLP

(57) ABSTRACT

A steering control device increases a steering reaction force of a steering reaction force actuator in a direction in which a lateral position of a host vehicle moves away from a travel path partition line when a turning amount of a turning actuator increases in the direction in which the lateral position of the host vehicle moves away from the travel path partition line. A steering reaction force control amount is computed for a reaction force suppression processing to reduce the steering reaction force control amount when the steering reaction force control amount has been at a threshold value or higher for a length of time. The reaction force suppression processing is carried out to control the steering reaction force actuator in lieu of the steering reaction force control amount. Meanwhile, the turning amount is maintained at a value occurring when the reaction force suppression processing began.

15 Claims, 12 Drawing Sheets

(58) Field of Classification Search
USPC .............................................. 701/41–44, 301
See application file for complete search history.

(56) References Cited

U.S. PATENT DOCUMENTS

| | | | | |
|---|---|---|---|---|
| 8,738,231 | B2 * | 5/2014 | Svensson | B60K 31/0008 180/443 |
| 2007/0055431 | A1 * | 3/2007 | Deng | B60T 8/1755 701/71 |
| 2009/0153360 | A1 * | 6/2009 | Kim | G08G 1/167 340/905 |
| 2010/0228438 | A1 * | 9/2010 | Buerkle | B62D 15/025 701/41 |
| 2012/0265403 | A1 * | 10/2012 | Svensson | B60K 31/0008 701/41 |
| 2015/0134218 | A1 * | 5/2015 | Ishida | B60W 30/095 701/70 |

FOREIGN PATENT DOCUMENTS

| | | |
|---|---|---|
| JP | 2007-183831 A | 7/2007 |
| JP | 2009-208602 A | 9/2009 |
| JP | 2010-30504 A | 2/2010 |
| JP | 2010-69983 A | 4/2010 |
| JP | 2010-179769 A | 8/2010 |

\* cited by examiner

STEERING CONTROL DEVICE

CROSS-REFERENCE TO RELATED APPLICATIONS

This application is a U.S. National stage application of International Application No. PCT/JP2014/063906, filed May 27, 2014, which claims priority to Japanese Patent Application No. 2013-135729 filed in Japan on Jun. 28, 2013.

BACKGROUND

Field of the Invention

The present invention relates to a steering control device.

Background Information

Japanese Laid-Open Patent Application No. 2001-48034 discloses a technique for increasing a steering reaction force in the direction in which the lateral position of the vehicle moves away from the white line (travel path partition line) in commensurate proximity to the white line to suppress vehicle lane departure and assist the driving of a driver.

SUMMARY

However, the driver relies excessively on drive assist and is liable to have reduced attention to driving when drive assist such as that described above continues for a long period of time. An object of the present invention is to provide a steering control device capable of increasing the attention of the driver on driving while suppressing lane departure.

In the present invention, when a steering reaction force actuator for imparting steering reaction force to a steering unit is controlled based on a steering reaction force control amount in which the steering reaction force increases in the direction in which the lateral position of a host vehicle moves away from a white line in commensurate proximity to the white line (travel path partition line), and when a turning actuator for imparting turning torque to a turning part mechanically separated from the steering unit is controlled based on a turning control amount in which the turning amount increases in the direction in which the lateral position of a host vehicle moves away from the white line in commensurate proximity to the white line (travel path partition line), the steering reaction force control amount of reaction force suppression processing for reducing the steering reaction force control amount is computed when a state in which the steering reaction force control amount has been at a predetermined threshold value or higher for a predetermined length of time, and the reaction force suppression processing is carried out for controlling the steering reaction force actuator based on the steering reaction force control amount of reaction force suppression processing in lieu of the steering reaction force control amount, and meanwhile, the turning amount is maintained at the value occurring at the starting time point of the reaction force suppression processing when the reaction force suppression processing has started.

Consequently, it is possible to suppress excessive reliance on drive assist by the driver and to increase the attention of the driver on driving while suppressing lane departure.

BRIEF DESCRIPTION OF THE DRAWINGS

Referring now to the attached drawings which form a part of this original disclosure.

DETAILED DESCRIPTION OF THE EMBODIMENTS

Figure 1:
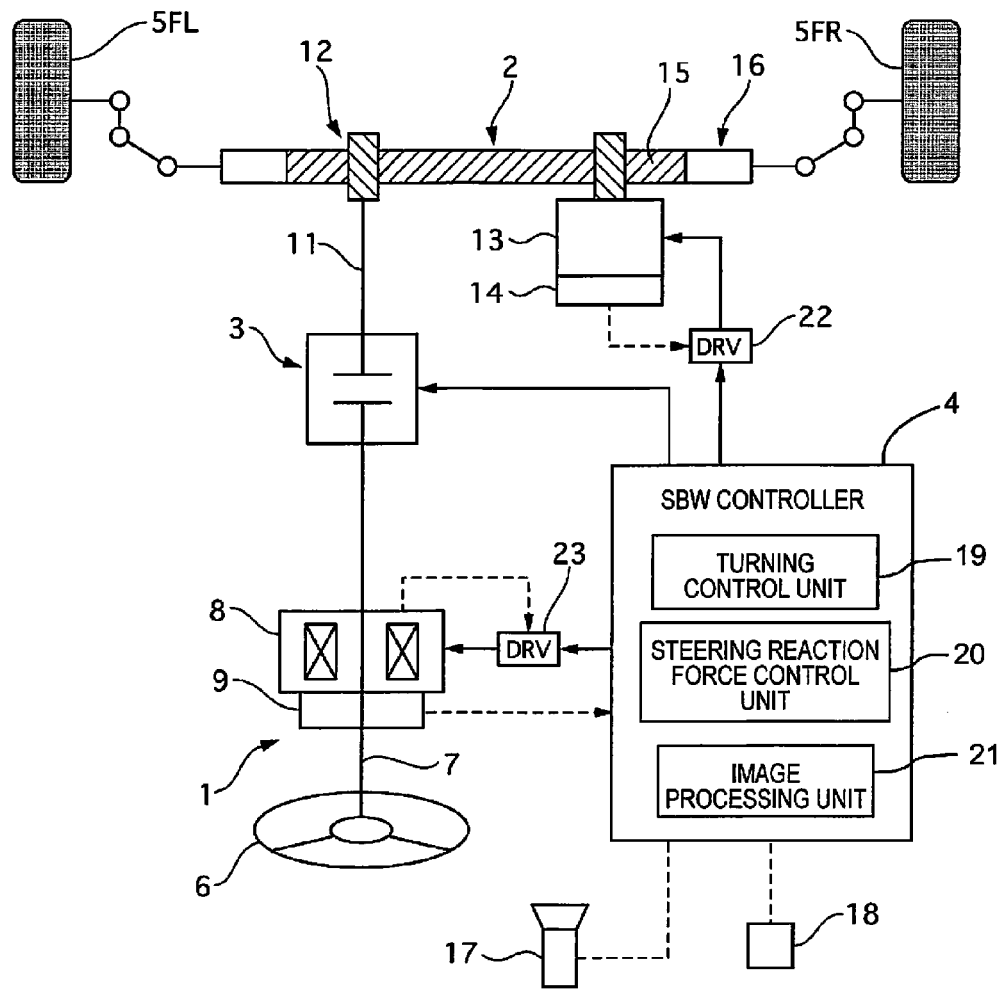
FIG. 1 is a schematic system diagram showing the steering system of the vehicle of the first embodiment.

FIG. 1 is a system view showing the steering system of a vehicle in accordance with a first embodiment.

The steering device of the first embodiment is mainly configured from a steering unit 1, a turning part 2, a backup clutch 3 and a steer-by-wire (SBW) controller 4, and the steering device employing an SBW system in which the steering unit 1 for receiving steering input of the driver and the turning part 2 for turning the left and right front wheels (turnable wheels) 5FL, 5FR are mechanically separated.

The steering unit 1 is provided with a steering wheel 6, a column shaft 7, a reaction force motor 8 and a steering angle sensor 9. The column shaft 7 integrally rotates with the steering wheel 6. The reaction force motor 8 is, e.g., a brushless motor, and is a coaxial motor in which the output shaft is coaxial with the column shaft 7 and outputs a steering reaction force torque to the column shaft 7 in accordance with a command from the SBW controller 4. The steering angle sensor 9 detects the absolute rotation angle of the column shaft 7, i.e., the steering angle of the steering wheel 6.

The turning part 2 is provided with a pinion shaft 11, a steering gear 12, a turning motor 13, and a turning angle sensor 14. The steering gear 12 is a rack-and-pinion steering gear and turns the front wheels 5L, 5R in accordance with the rotation of the pinion shaft 11. The turning motor 13 is, e.g., a brushless motor, and the output shaft is connected to a rack gear 15 via a reduction gear (not shown), the output shaft outputting a turning torque for turning the front wheels 5 to a rack 16 in accordance with a command from the SBW controller 4. The turning angle sensor 14 detects the absolute rotation angle of the turning motor 13. Here, the rotation angle of the turning motor 13 and the turning angle of the front wheels 5 have a constant uniquely established correlation, and the turning angle of the front wheels 5 can therefore be detected from the rotation angle of the turning motor 13. Unless otherwise noted, the turning angle of the front wheels 5 is hereinbelow calculated from the rotation angle of the turning motor 13. The backup clutch 3 is provided between the column shaft 7 of the steering unit 1 and the pinion shaft 11 of the turning part 2, is disengaged to thereby mechanically separate the steering unit 1 and the turning part 2, and is engaged to thereby mechanically connect the steering unit 1 and the turning part 2.

In addition to the angles detected by steering angle sensor 9 and the turning angle sensor 14, the vehicle speed (car body speed) detected by images of the travel path forward of the host vehicle captured by a camera 17 and by a vehicle speed sensor 18 is inputted to the SBW controller 4. The SBW controller 4 has a turning control unit 19 for controlling the turning angle of the front wheels 5FL, 5FR, a steering reaction force control unit 20 for controlling the steering reaction force torque imparted to the column shaft 7, and an image processing unit 21. The turning control unit 19 generates a command turning angle based on various input information, and outputs the generated command turning angle to an electric current driver 22. The electric current driver 22 controls a command electric current to the turning motor 13 by angle feedback for causing the actual turning angle detected by the turning angle sensor 14 and the command turning angle to match. The steering reaction force control unit 20 generates a command steering reaction force torque based on various input information, and outputs the generated steering reaction force torque to the electric current driver 23. The electric current driver 23 controls the command electric current to the reaction force motor 8 by torque feedback for causing the actual steering reaction force torque estimated from the electric current value of the reaction force motor 8 to match the command steering reaction force torque. The image processing unit 21 recognizes a white line (travel path partition line) to the left and right of the travel lane by edge extraction or other image processing from the images of the travel path forward of the host vehicle captured by the camera 17. Additionally, the SBW controller 4 engages the backup clutch 3 to mechanically link the steering unit 1 and the turning part 2 when the SBW system has failed, and allows movement of the rack 16 in the axial direction by steering of the steering wheel 6. At this time, it is also possible to perform control that corresponds to an electric power steering system for aiding the steering force of the driver using the assist torque of the turning motor 13. A redundant system provided with a plurality of sensors, controllers, and motors may be used in the SBW system. Also, the turning control unit 19 and the steering reaction force control unit 20 may be separate units.

In the first embodiment, stability control and corrective steering reduction control are carried out with the aim of reducing the steering burden and the amount of corrective steering by the driver. Stability control is implemented by two types of feedback (F/B) for the purpose of improving the stability of the vehicle against external disturbances (crosswind, road surface unevenness, ruts, road surface gradient, and the like).

1. Yaw Angle F/B Control

The turning angle is corrected in accordance with the yaw angle, which is the angle formed by the white line and direction of travel of the host vehicle to reduce the yaw angle generated by an external disturbance.

2. Lateral Position F/B Control

The turning angle is corrected in accordance with the distance (lateral position) to the white line to reduce change in the lateral position, which is the integral value of the yaw angle generated by an external disturbance.

Corrective steering reduction control performs three reaction force offset controls for the purpose of improving the stability of the vehicle in relation to steering input of the driver.

1. Reaction Force Offset Control Corresponding to the Lateral Position

The steering reaction force characteristic corresponding to the self-aligning torque is offset in accordance with the lateral position in the direction in which the absolute value of the steering reaction force is increased, and inversion of the sign of the steering torque is suppressed when the driver has performed corrective steering that straddles the neutral position of the steering angle.

2. Reaction Force Offset Control Corresponding to Deviation Margin Time

The steering reaction force characteristic corresponding to the self-aligning torque is offset in accordance with the deviation margin time (arrival time to the white line) in the direction in which the absolute value of the steering reaction force is increased, and inversion of the sign of the steering torque is suppressed when the driver has performed corrective steering that straddles the neutral position of the steering angle.

3. Reaction Force Offset Control Corresponding to the Curvature

The steering reaction force characteristic corresponding to the self-aligning torque is offset in accordance with the curvature of the white line in the same sign direction as that of the self-aligning torque, the steering reaction force characteristic reducing the steering effort of the driver during cornering and suppressing a change in the held steering angle in relation to a change in the steering effort.

Turning Control Unit

Figure 2:
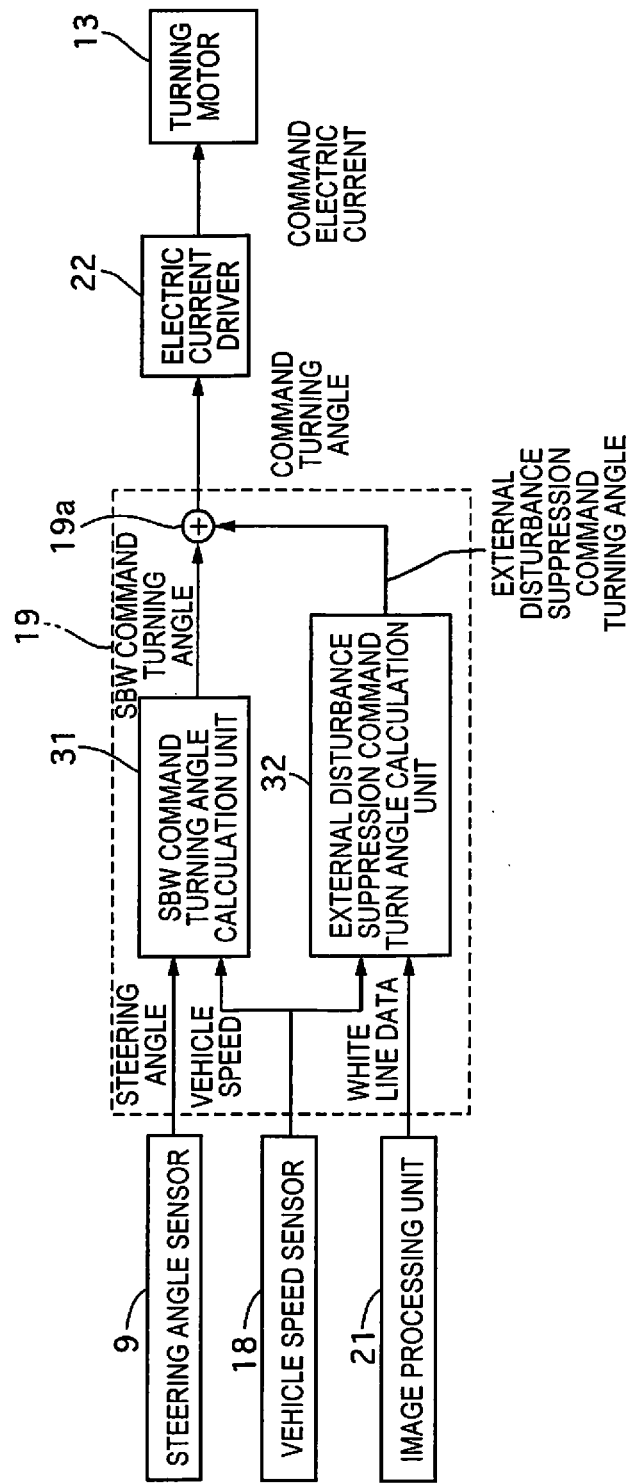
FIG. 2 is a control block diagram of the turning control unit of the steering control device.

FIG. 2 is a control block view of the turning control unit 19. A SBW turning angle command calculation unit 31 computes a SBW command turning angle based on the steering angle and the vehicle speed. An external disturbance suppression turning angle command calculation unit 32 computes an external disturbance suppression command turning angle for correcting the SBW command turning angle in stability control based on the vehicle speed and white line data. The specific details of the external disturbance suppression turning angle command calculation unit 32 are later described. An adder 19a outputs a value obtained by adding the SBW command turning angle and the external disturbance suppression command turning angle to the electric current driver 22 as the final command turning angle.

Steering Reaction Force Control Unit

Figure 3:
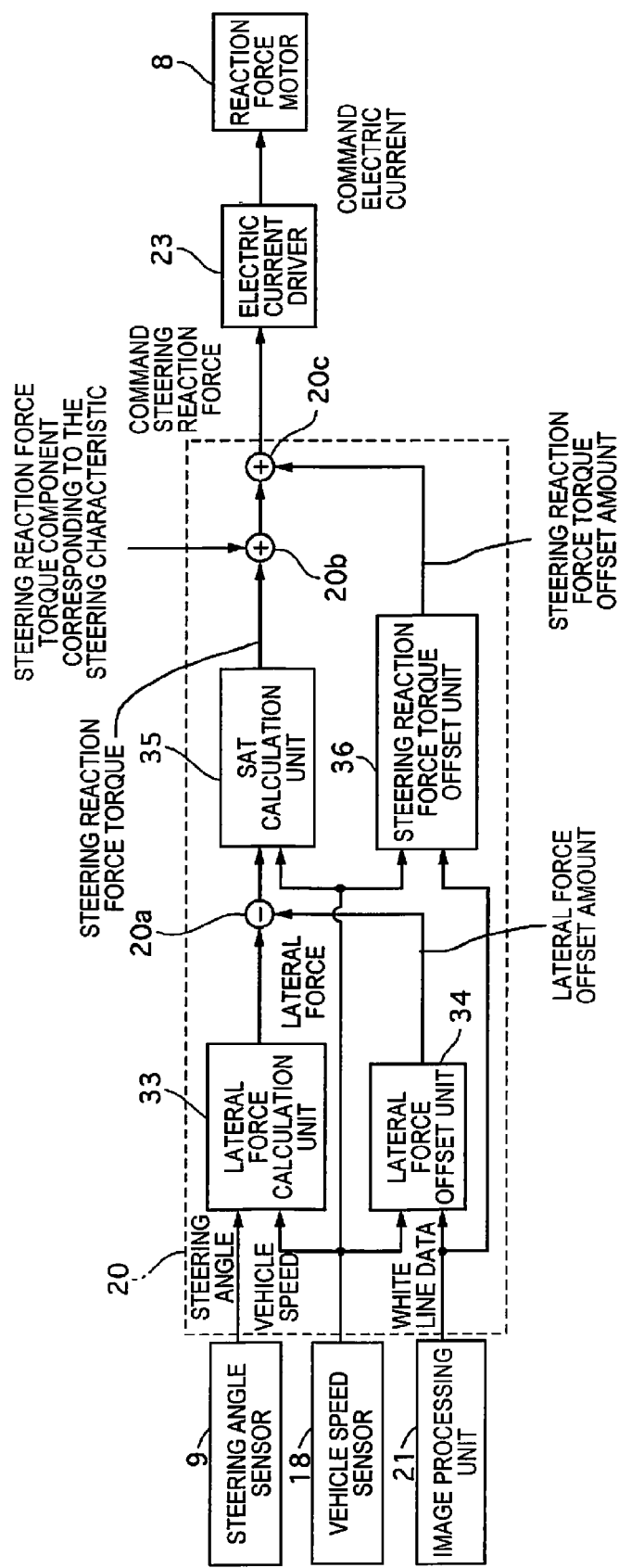
FIG. 3 is a control block diagram of the steering reaction force control unit 20.

FIG. 3 is a control block view of the steering reaction force control unit 20. A lateral force calculation unit 33 computes tire lateral force based on the steering angle and the vehicle speed with reference to a steering angle-to-lateral force conversion map that represents a relationship between the steering angle and the tire lateral force at each vehicle speed in a conventional steering device obtained by experimentation and the like in advance. The steering angle-to-lateral force conversion map has characteristics in which the tire lateral force is greater as the steering angle is greater, the amount of change in the tire lateral force in relation to the amount of change in the steering angle is greater when the steering angle is less than when the steering angle is greater, and the tire lateral force is reduced as the vehicle speed is increased. The lateral force offset unit 34 computes, based on the vehicle speed and white line data, a lateral force offset amount for offsetting steering reaction force characteristics in reaction force offset control that corresponds to curvature. The specific details of the lateral force offset unit 34 are later described. A subtracter 20a subtracts the lateral force offset amount from the tire lateral force. A SAT calculation unit 35 computes the steering reaction force torque generated by the tire lateral force based on the vehicle speed and the tire lateral force that has been offset by the lateral force offset amount with reference to a lateral force-to-steering reaction force torque conversion map that represents the relationship between the tire lateral force and the steering reaction force torque in a conventional steering device obtained by experimentation or the like in advance. The tire lateral force-to-steering reaction force torque conversion map has characteristics in which the steering reaction force torque is greater as the tire lateral force is greater, the amount of change in the steering reaction force torque in relation to the amount of change in the tire lateral force is greater when the tire lateral force is less than when the tire lateral force is greater, and the steering reaction force torque is reduced as the vehicle speed is increased. These characteristics simulate the reaction force generated in the steering wheel by a self-aligning torque in which the wheels attempt to return to a rectilinear state caused by a road surface reaction force in a conventional steering device. The lateral force calculation unit 33 and the SAT calculation unit 35 correspond to turning state estimation means for estimating the self-aligning torque (turning state of the turning part) based on the steering angle of the steering wheel 6.

An adder 20b adds a steering reaction force torque component (spring term, viscosity term, momentum term) corresponding to the steering characteristics and the steering reaction force torque. The spring term is a component proportional to the steering angle and is calculated by multiplying the steering angle by a predetermined gain. The viscosity term is a component proportional to the steering angular speed and is calculated by multiplying the steering angular speed by a predetermined gain. The momentum term is a component proportional to the steering angular acceleration and is calculated by multiplying the steering angular acceleration by a predetermined gain. A steering reaction force torque offset unit 36 computes the steering reaction force torque offset amount for offsetting the steering reaction force characteristic in reaction force offset control corresponding to the lateral position or the deviation margin time based on the vehicle speed and the image of the travel path forward of the host vehicle. The specific details of the steering reaction force torque offset unit 36 are later described. An adder 20c outputs a value as the final command steering reaction force torque to the electric current driver 23, the value being obtained by adding the steering torque offset amount and the steering reaction force torque to which the steering reaction force torque component corresponding to the steering characteristic has been added.

External Disturbance Suppression Turning Angle Command Calculation Unit

Figure 4:
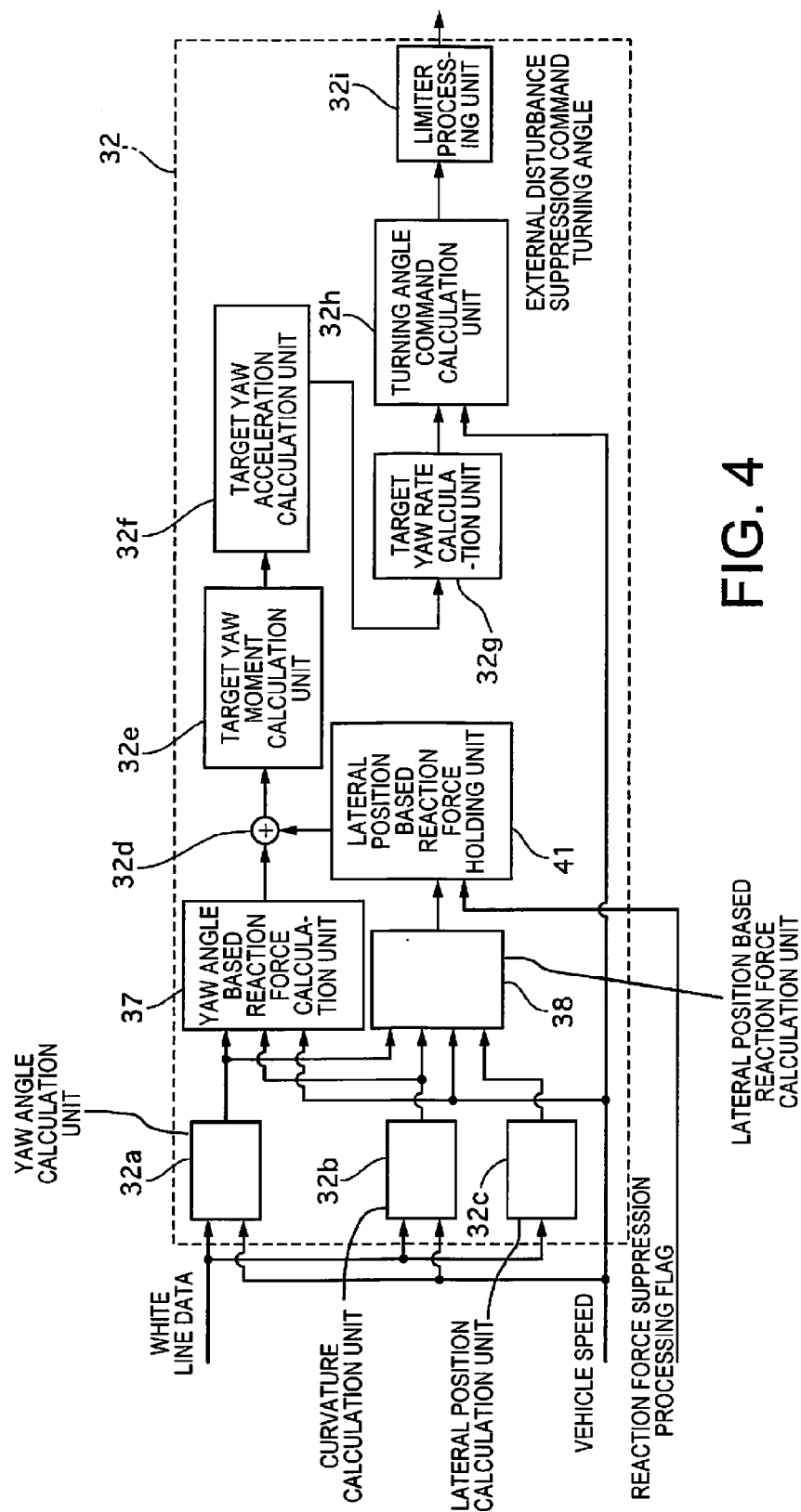
FIG. 4 is a control block diagram of the external disturbance suppression turning angle command calculation unit 32.

FIG. 4 is a control block view of the external disturbance suppression turning angle command calculation unit 32. A yaw angle calculation unit 32a computes the yaw angle, which is the angle formed by the white line and the traveling direction of the host vehicle at a forward fixation point. The yaw angle at the forward fixation point is an angle formed by the white line and the traveling direction of the host vehicle after a predetermined length of time (e.g., 0.5 seconds). Computing the yaw angle based on an image of the travel path captured by the camera 17 allows the yaw angle to be detected with high precision in a simple manner. A curvature calculation unit 32b computes the curvature of the white line at the forward fixation point. A lateral position calculation unit 32c computes the distance to the white line at the forward fixation point. The yaw angle based reaction force calculation unit 37 computes the reaction force of the vehicle for reducing the yaw angle generated by an external disturbance in yaw angle F/B control based on the yaw angle, the curvature, and the vehicle speed. The specific details of the yaw angle based reaction force calculation unit 37 are later described. The lateral position based reaction force calculation unit 38 calculates the reaction force of the vehicle for reducing the change in lateral position generated by external disturbance in lateral position F/B control based on the yaw angle, the curvature, the vehicle speed, and the distance to the while line at the forward fixation point. The specific details of the lateral position based reaction force calculation unit 38 are later described.

The lateral position based reaction force holding unit 41 directly outputs the lateral position based reaction force (calculated value) as calculated by the lateral position based reaction force calculation unit 38 when the reaction force suppression processing flag is in a reset (=0) state, and, in the case that the reaction force suppression processing flag has been set (=1), holds the calculated value of when the reaction force suppression processing flag was reset until the reaction force suppression processing flag is reset. In this case, the calculated value is outputted when the calculated value is less than the held value. In other words, the lateral position based reaction force is determined by selecting the lower of the calculated value and the held value. When the reaction force suppression processing flag has switched from a set state to a reset state, the held value is restored with a constant slope to the calculated value. After the held value has been restored to the calculated value, the reaction force suppression processing flag is in a reset state and the calculated value is therefore directly outputted. The reaction force suppression processing flag is later described. An adder 32d adds the reaction force corresponding to the yaw angle and the reaction force corresponding to the lateral position to compute the reaction force in the lateral direction. A target yaw moment calculation unit 32e computes a target yaw moment based on the reaction force in the lateral direction, the wheel base (distance between axles), and the rear wheel axle load and front wheel axle load. Specifically, the value obtained by multiplying wheel base and the ratio of the rear wheel axle load in relation to the vehicle weight (front wheel axle load+rear wheel axle load) is used as the target yaw moment in relation to the reaction force in the lateral direction. A target yaw acceleration calculation unit 32f multiplies the target yaw moment and the yaw moment of inertia coefficient to compute the target yaw acceleration. A target yaw rate calculation unit 32g multiplies the time headway and the target yaw acceleration to compute the target yaw rate.

A turning angle command calculation unit 32h computes the external disturbance suppression command turning angle $\delta_{st}^*$ with reference to the following formula based on the target yaw rate $\phi^*$, the wheelbase WHEEL_BASE, the vehicle speed V, and the vehicle characteristics speed vCh. As used herein, the vehicle characteristics speed vCh is a parameter in a known "Ackermann formula" and represents the self-steering characteristic of a vehicle.

$$\delta st^* = (\phi^* \times WHEEL\_BASE \times (1+(V/vCh)^2) \times 180)/(V \times M\_PI)$$

where M_PI is a predetermined coefficient.

A limiter processing unit 32i limits the upper limit of the change rate and the maximum value of the external disturbance suppression command turning angle $\delta_{st}^*$. The maximum value is the turning angle range (e.g., 0.2° left and right) of the front wheels 5FL, 5FR corresponding to the range of play when the steering angle of the steering wheel 6 is in the angle range (e.g., 3° left and right) of play near the neutral position in a conventional steering device (in which the steering unit and the turning part are mechanically connected).

Figure 5:
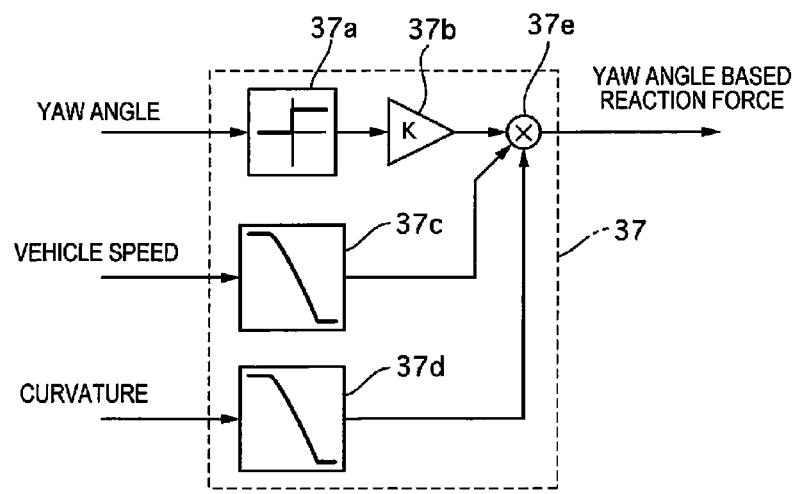
FIG. 5 is a control block diagram of the yaw angle based reaction force calculation unit 37.

FIG. 5 is a control block view of the yaw angle based reaction force calculation unit 37. An upper/lower limit limiter 37a limits the upper and lower limits of yaw angle. The upper/lower limit limiter sets a predetermined value or higher that is capable of suppressing an external disturbance, and a value that is less than a value at which the vehicle becomes vibrational and a value generated by steering of the driver (e.g., 1°) when the yaw angle is a positive value (a positive yaw angle occurs when the white line and an extended line in the traveling direction of the host vehicle intersect). The upper/lower limit limiter sets the value to 0 when the yaw angle is negative. A yaw angle F/B gain multiplication unit 37b multiplies the limited yaw angle by the yaw angle F/B gain. The yaw angle F/B gain is a predetermined value or higher that is capable of ensuring responsiveness while avoiding an insufficient amount of control, and is less than a value at which the vehicle becomes vibrational and a value at which the driver senses displacement from neutral between the steering angle and the turning angle.

A vehicle speed correction gain multiplication unit 37c multiplies the vehicle speed by a vehicle speed correction gain. The vehicle speed correction gain is characteristic in being at a maximum value in the range of 0 to 70 km/h, gradually decreasing in the range of 70 to 130 km/h, and being at a minimum value (0) in the range of 130 km/h and higher. A curvature correction gain multiplication unit 37d multiplies the curvature by a curvature correction gain. The curvature correction gain is characteristic in being smaller as the curvature increases, and sets an upper limit and a lower limit (0). A multiplier 37e multiplies the outputs of the yaw angle F/B gain multiplication unit 37b and each of the vehicle speed correction gain multiplication unit 37c and the curvature correction gain multiplication unit 37d to determine the reaction force corresponding to the yaw angle.

Figure 6:
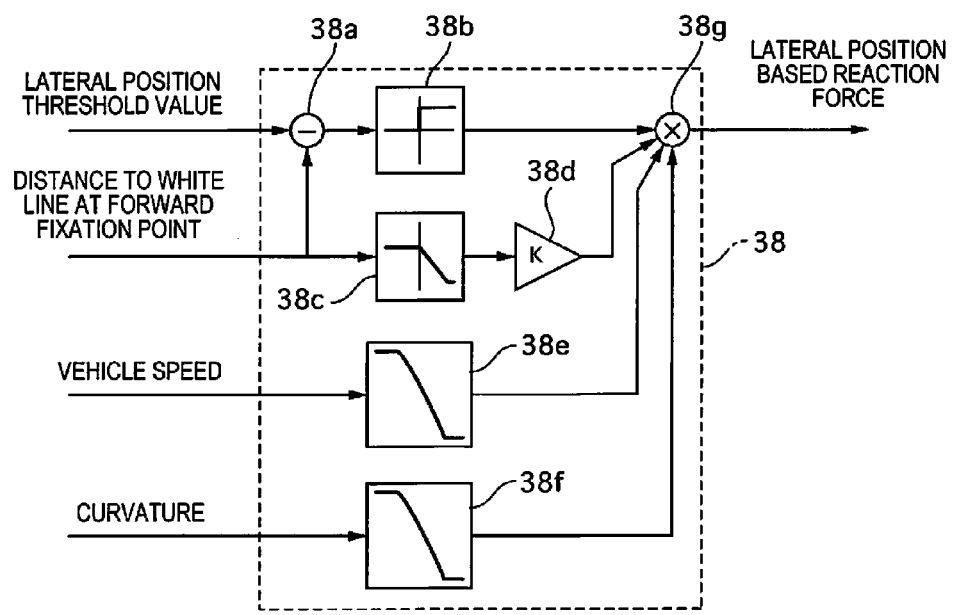
FIG. 6 is a control block diagram of the lateral position based reaction force calculation unit 38.

FIG. 6 is a control block view of the lateral position based reaction force calculation unit 38. A subtracter 38a subtracts the distance to the white line at a forward fixation point from the lateral position threshold value (e.g., 90 cm) set in advance to determine the lateral position deviation. An upper/lower limit limiter 38b limits the upper and lower limits of the lateral position deviation. The upper/lower limit limiter sets a predetermined positive value when the lateral position deviation is a positive value. The upper/lower limit limiter sets the value to 0 when the lateral position deviation is negative. A distance correction gain multiplication unit 38c multiplies the distance to the white line at the forward fixation point by a distance correction gain. The distance correction gain sets a lower limit, the distance correction gain being characterized in being a maximum value when the distance to the white line is at a predetermined value or less and in being a lower value as the distance increases when the predetermined value has been exceeded.

A lateral position F/B gain multiplication unit 38d multiplies the distance to the white line as corrected by the distance correction gain multiplication unit 38c by a lateral position F/B gain. The lateral position F/B gain is a predetermined value or higher that is capable of ensuring responsiveness while avoiding an insufficient amount of control, and is less than a value at which the vehicle becomes vibrational and a value at which the driver senses displacement from neutral, and is furthermore set to a lower value than the yaw angle F/B gain of the yaw angle F/B gain multiplication unit 37b. A vehicle speed correction gain multiplication unit 38e multiplies the vehicle speed by a vehicle speed correction gain. The vehicle speed correction gain is characteristic in being a maximum value in the range of 0 to 70 km/h, gradually decreasing in the range of 70 to 130 km/h, and being at a minimum value (0) in the range of 130 km/h and higher. A curvature correction gain multiplication unit 38f multiplies the curvature by a curvature correction gain. The curvature correction gain is characteristic in being smaller as the curvature increases, and sets an upper limit and a lower limit (0). A multiplier 38g multiplies the outputs of the lateral position F/B gain multiplication unit 38d and each of the vehicle speed correction gain multiplication unit 38e and the curvature correction gain multiplication unit 38f to determine reaction force corresponding to the lateral position.

Stability Control Effect

Figure 7:
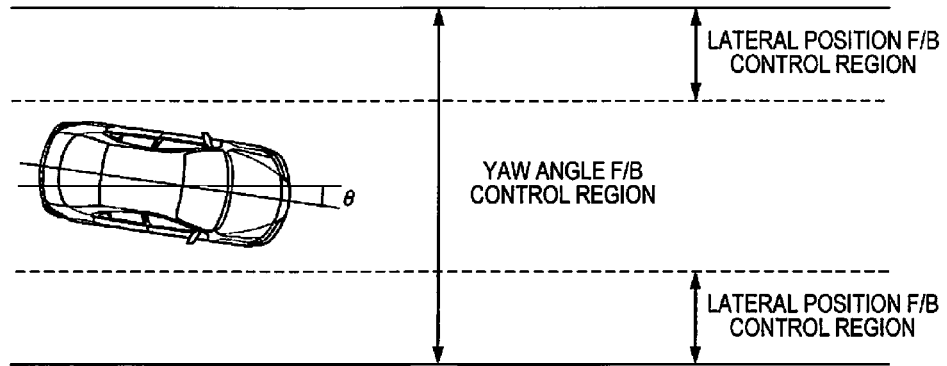
FIG. 7 is a control block diagram showing the control region of the yaw angle F/B control and the lateral position F/B control.

In the first embodiment, yaw angle F/B control for reducing the yaw angle generated by an external disturbance and lateral position F/B control for reducing change in the lateral position, which is the integral value of the yaw angle generated by the external disturbance, are carried out as stability control. The yaw angle F/B control is carried out regardless of the lateral position when a yaw angle has been generated, and the lateral position F/B control is carried out when the distance to the white line is at a predetermined lateral position threshold value (90 cm) or less. In other words, the center vicinity of the travel lane is a dead zone of lateral position F/B control. The control region of both F/B controls is shown in FIG. 7. $\phi$ is the yaw angle.

Figure 8:
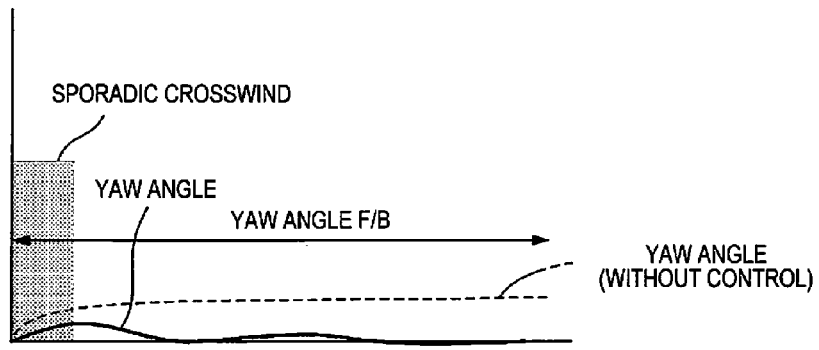
FIG. 8 is a timing chart showing change in the yaw angle when the vehicle traveling on a straight road of an expressway undergoes sporadic crosswinds.

FIG. 8 is a timing chart showing change in the yaw angle when the vehicle traveling on a straight road of an expressway undergoes sporadic crosswinds, and the vehicle is assumed to be traveling in the center vicinity of the travel lane. When the vehicle undergoes a sporadic crosswind and a yaw angle is generated in yaw angle F/B control, the reaction force corresponding to the yaw angle is computed, an external disturbance suppression command turning angle for obtaining the reaction force is determined, and a SBW command turning angle based on the steering angle and the vehicle speed is corrected. When the vehicle is traveling along a travel lane, on a straight road in particular, the yaw angle is zero because the direction of the white line and the traveling direction of the host vehicle match. In other words, in the yaw angle F/B control of the first embodiment, the generated yaw angle is deemed to be caused by an external disturbance, and reducing the yaw angle makes it possible to ensure improvement in stability of the vehicle in relation to an external disturbance during straight-line travel in particular and allows the corrective steering amount of the driver to be reduced.

Conventionally, a device for imparting turning torque to a steering system to suppress external disturbance is known in a conventional steering device as a device for suppressing the effect of a crosswind or other external disturbance on vehicle behavior. A device for imparting to the steering wheel a turning reaction force component for urging a turn so as to suppress an external disturbance is known in a SBW system. However, in these conventional turning devices, an unpleasant sensation is experienced by the driver because fluctuation occurs in the steering reaction force. In contrast thereto, in view of the fact that the steering wheel 6 and the front wheels 5L, 5R can be controlled independently from each other, which is a characteristic of a SBW system in which the steering wheel 6 and the front wheels 5L, 5R are mechanically separated, in stability control that includes yaw angle F/B control of the first embodiment, the turning angle of the front wheels 5L, 5R is controlled based on a command turning angle obtained by adding the SBW command turning angle that corresponds to the steering angle and the vehicle speed, and the external disturbance suppression command turning angle that corresponds to the yaw angle, and meanwhile the tire lateral force is estimated based on the steering angle and the vehicle speed, and the steering reaction force is controlled based on the command steering reaction force that corresponds to the vehicle speed and the estimated tire lateral force. In other words, it is not required that a steering reaction force component for urging a turn for suppressing an external disturbance be imparted in order to give a turning angle of the external disturbance-suppressing portion directly to the front wheels 5L, 5R. Furthermore, imparting a steering reaction force that corresponds to the tire lateral force estimated from the turning angle allows an unpleasant sensation experienced by the driver to be reduced because the fluctuation of the tire lateral force caused by a turn for suppressing an external disturbance is not reflected in the steering reaction force. In a conventional SBW system, the tire lateral force is estimated from the turning angle and/or the rack shaft force detected by a sensor, and a steering reaction force corresponding to the estimated tire lateral force is imparted. Accordingly, fluctuation in the tire lateral force caused by a turn for suppressing an external disturbance is not always reflected in the steering reaction force and the driver experiences an unpleasant sensation. In the first embodiment, only the tire lateral force caused by a turn for suppressing an external disturbance is reflected in the steering reaction force, and the unpleasant sensation imparted to the driver can be reduced because the steering reaction force does not fluctuate due to a turn for suppressing an external disturbance.

Here, when the turning angle of the external disturbance-suppressing portion is given directly to the front wheels 5L, 5R, the neutral displacement between the steering angle and the turning angle becomes a problem, and in the first embodiment, the external disturbance suppression command turning angle is set to a turning angle range (e.g., 0.2° left and right) of the front wheels 5FL, 5FR corresponding to the range of play when the steering wheel 6 is in the angle range (e.g., 3° left and right) of play near the steering angle neutral position in a conventional steering device. The occurrence of a yaw angle caused by an external disturbance is more considerable during rectilinear travel than during cornering, and during rectilinear travel, the steering angle is positioned in the vicinity of the steering angle neutral position. In other words, correction of the turning angle by yaw angle F/B control is mostly carried out in the vicinity of the steering angle neutral position, and suppressing the amount of neutral displacement between the steering angle and the turning angle that accompanies imparting of the external disturbance suppression command turning angle to the steering play range makes it possible to suppress an unpleasant sensation that accompanies neutral displacement. Because the external disturbance suppression command turning angle is limited to 0.2° left and right, it is possible to change the traveling direction of the host vehicle to a desired direction using the steering inputted by the driver, even when stability control is being carried out. In other words, because the amount of correction of the turning angle by the external disturbance suppression command turning angle is low in relation to the amount of change in the turning angle caused by the steering input of the driver, it is possible to improve the stability of a vehicle in relation to an external disturbance without interfering with the steering of the driver.

Conventionally known ways of controlling movement of the vehicle in the lateral direction are lane deviation prevention control for imparting a yaw moment to the vehicle to avoid deviation when the vehicle is detected to be tending to deviate from the travel lane, and lane-maintenance control for imparting a yaw moment to the vehicle so that the vehicle will travel in the center vicinity of the travel lane. However, lane deviation prevention control involves a threshold value for control intervention, and because control does not operate in the center vicinity of the travel lane, vehicle stability in relation to an external disturbance cannot be ensured. Also, because control intervention is carried out due to the threshold value even when the driver desires to bring the vehicle to the edge of the travel lane, the driver may experience annoyance. On the other hand, lane-maintenance control involves a target position (target line), and although vehicle stability in relation to an external disturbance can be ensured, it is not possible to travel along a line that departs from the target line. Additionally, control is disengaged when it is assessed that the steering wheel has been released when the driver has reduced the gripping force on the steering wheel. Therefore, the driver must grip the steering wheel with a fixed force or greater, and the steering burden on the driver is high. In contrast, the yaw angle F/B control of the first embodiment does not involve a threshold value for control intervention, and it is therefore possible to constantly ensure stability with seamless control in relation to an external disturbance. Furthermore, the yaw angle F/B control does not involve a target position, and the driver is therefore able to cause the vehicle to travel along a desired line. Additionally, control is not disengaged even when the steering wheel 6 is held lightly, and the steering burden on the driver can therefore be reduced.

Figure 9:
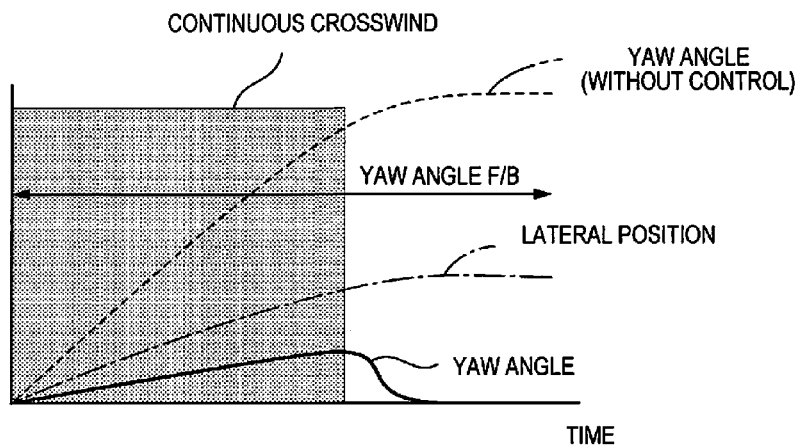
FIG. 9 is a timing chart showing yaw angle change and lateral position change when lateral position F/B control is not carried out when the vehicle undergoes a continuous crosswind while traveling on a straight road of an expressway.

FIG. 9 is a timing chart showing yaw angle change and lateral position change when lateral position F/B control is not carried out when the vehicle undergoes a continuous crosswind while traveling on a straight road of an expressway, and the vehicle is assumed to be traveling in the center vicinity of the travel lane. When the vehicle undergoes a continuous crosswind and a yaw angle is generated, the yaw angle is reduced by yaw angle F/B control, but the vehicle undergoes a continuous external disturbance and drifts laterally. This is due to the fact that yaw angle F/B control reduces a yaw angle and does not correct the turning angle when the yaw angle is zero, and therefore, change in the lateral position, which is an integral value of the yaw angles generated by the external disturbance, cannot be directly reduced. Setting the reaction force corresponding to the yaw angle to a high value makes it possible to indirectly suppress changes in the lateral position (suppress an increase in the integral value of the yaw angles), but because the maximum value of the external disturbance suppression command turning angle is limited to 0.2° left and right so that an unpleasant sensation is experienced by the driver, it is difficult to effectively suppress lateral drift of the vehicle using only yaw angle F/B control. The yaw angle F/B gain for determining the reaction force corresponding to the yaw angle must furthermore cause the yaw angles to converge before the driver perceives a change in the yaw angle, and because the vehicle becomes vibrational without this convergence even though the value is set as high as possible, the yaw angle multiplied by the yaw angle F/B gain is limited to an upper limit (1°) or less by the upper/lower limit limiter 37a. In other words, the reaction force corresponding to the yaw angle is a reaction force that corresponds to a smaller yaw angle than the actual yaw angle, and from this aspect as well, it is apparent that it is difficult to effectively suppress lateral drift of the vehicle using only yaw angle F/B control.

Figure 10:
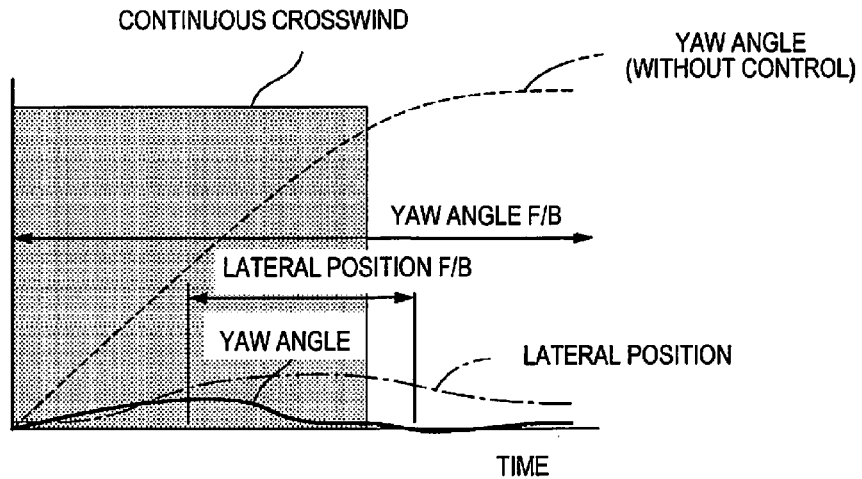
FIG. 10 is a timing chart showing yaw angle change and lateral position change when lateral position F/B control has been carried out when the vehicle undergoes a continuous crosswind while traveling on a straight road of an expressway.

In view of the above, the stability control of the first embodiment introduces lateral position F/B control to suppress lateral drift of the vehicle due to a steady external disturbance. FIG. 10 is a timing chart showing yaw angle change and lateral position change when lateral position F/B control has been carried out when the vehicle undergoes a continuous crosswind while traveling on a straight road of an expressway. When a vehicle traveling in the center vicinity of a travel lane undergoes a continuous crosswind and drifts laterally, and the distance to the white line reaches a lateral position threshold value or less in lateral position F/B control, a reaction force corresponding to the change in lateral position (which is approximately equal to the integral value of the yaw angle) is computed. The external disturbance suppression turning angle command calculation unit 32 computes the external disturbance suppression command turning angle, which is based on the reaction force in the lateral direction obtained by adding the reaction force that corresponds to the lateral position and the reaction force that corresponds to the yaw angle, and corrects the SBW command turning angle. That is to say, lateral position F/B control corrects the SBW command turning angle using the external disturbance suppression command turning angle that corresponds to the lateral position, and it is therefore possible to directly reduce the change in lateral position caused by a steady external disturbance and lateral drift of the vehicle can be suppressed. In other words, the travel position of the vehicle in which yaw angle F/B control is carried out can be returned to the center vicinity of the travel lane, which is the dead zone of lateral position F/B control.

As described above, stability control of the first embodiment reduces the change in yaw angle caused by a transient external disturbance using yaw angle F/B control, and reduces the integral value of the yaw angle (change in the lateral position) caused by a steady external disturbance using lateral position F/B control, thereby making it possible to improve stability of the vehicle in relation to both transient and steady external disturbances. Furthermore, stability control of the first embodiment limits vehicle behavior produced by the control (imparted by the external disturbance suppression command turning angle) to a level not perceived by the driver and to a level that does not interfere with changes in the vehicle behavior generated by driver steering, and because change in the self-aligning torque produced by the control is not reflected in the steering reaction force, stability control can be carried out without the driver being aware that stability control is being carried out. It is thereby possible to simulate behavior in a vehicle having vehicle body specifications that have excellent stability in relation to external disturbances. The lateral position F/B gain for determining the reaction force that corresponds to the lateral position in lateral position F/B control is set to a lower value than the yaw angle F/B gain. As described above, this is due to the fact that because the yaw angle F/B control must cause the yaw angles to converge before the driver perceives a change in the yaw angle caused by a transient external disturbance, there is a need for high responsiveness, and in contrast, lateral position F/B control must stop an increase in change in the lateral position, time is required for the lateral position to change due to accumulation of the yaw angle integral values, and the responsiveness on the level of yaw angle F/B control is therefore not required. Additionally, even if the lateral position F/B gain is set high, the amount of control greatly fluctuates in accordance with the magnitude of the external disturbance, and the driver would experience an unpleasant sensation.

Lateral Force Offset Unit

Figure 11:
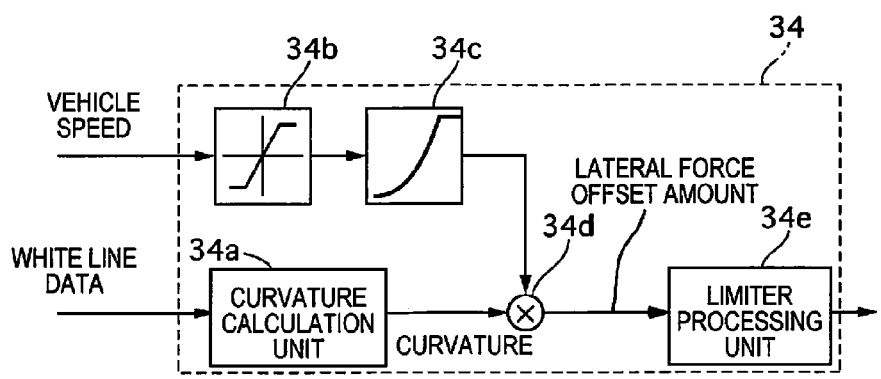
FIG. 11 is a control block view of the lateral force offset unit 34.

FIG. 11 is a control block view of the lateral force offset unit 34. A curvature calculation unit 34a computes the curvature of the white line at the forward fixation point. An upper/lower limit limiter 34b limits the upper and lower limits of vehicle speed. A SAT gain calculation unit 34c computes the SAT gain that corresponds to the vehicle speed based on the limited vehicle speed. The SAT gain sets an upper limit, the SAT gain being characteristic in that the gain is greater as the vehicle speed is higher. A multiplier 34d multiplies the curvature by the SAT gain to determine the lateral force offset amount. A limiter processing unit 34e limits the maximum value of the lateral force offset amount and the upper limit of the rate of change. For example, the maximum value is 1,000 N, and the upper limit of the rate of change is 600 N/s.

Effect of Reaction Force Offset Control Corresponding to the Curvature

Figure 12:
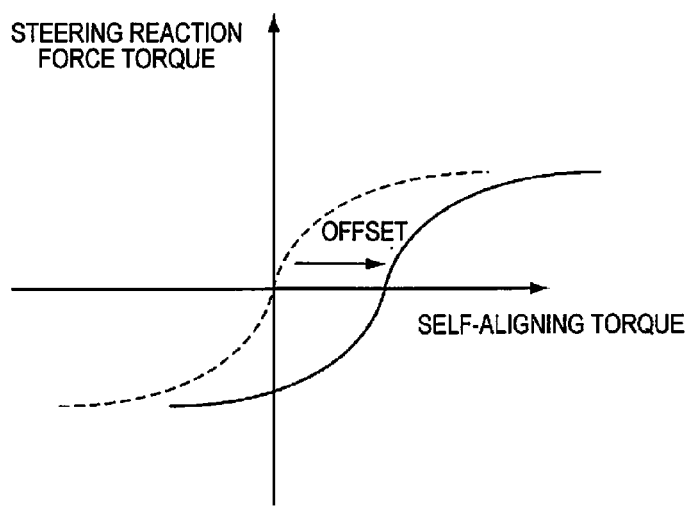
FIG. 12 is a diagram showing the state in which the steering reaction force characteristic representing the steering reaction force torque that corresponds to the self-aligning torque has been offset in the same direction as the self-aligning torque.

Reaction force offset control corresponding to the curvature determines a lateral force offset amount which is greater as the curvature of the white line is greater, and subtracts the lateral force offset amount from the tire lateral force. The steering reaction force torque that corresponds to the tire lateral force computed by the SAT calculation unit 35, i.e., the steering reaction force characteristic representing the steering reaction force torque that corresponds to the self-aligning torque is offset in the same sign direction as that of the self-aligning torque in commensurate fashion to a greater curvature of the white line, as shown in FIG. 12. FIG. 12 shows the case of a right curve, and when the curve is a left curve, the offset occurs in the direction opposite of that in FIG. 12.

Conventionally, in a SBW system in which the steering angle and the turning angle are mechanically separated, the steering angle reaction force characteristic for simulating a steering reaction force that corresponds to the self-aligning torque in a conventional steering device is set and a steering reaction force is imparted to the steering wheel based on the steering reaction force characteristic. In this case, the relationship between the steering angle of the steering wheel and the steering torque of the driver is shown as characteristic A in FIG. 13. In other words, the absolute value of the steering torque increases as the absolute value of the steering angle increases, and the amount of change in the steering torque in relation to the amount of change in the steering angle increases more greatly when the absolute value of the steering angle is smaller than when the absolute value of the steering angle is greater.

Figure 13:
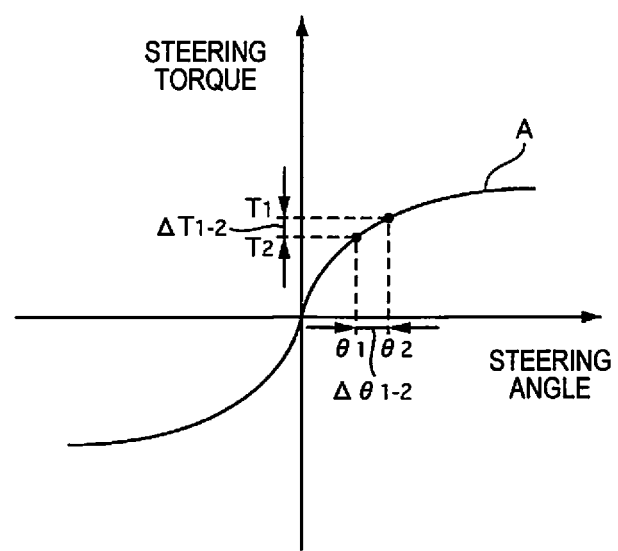
FIG. 13 is a characteristics diagram showing the relationship between the steering angle of the steering wheel and the steering torque of the driver.

Here, the case in which the driver changes the held steering torque in order to make a course correction during cornering will be considered. In FIG. 13, when the held steering torque is reduced to $T_2$ from the state in which the driver has held the steering angle $\theta_1$ at the held steering torque $T_1$, the steering angle becomes $\theta_2$ and the steering angle of the front wheels 5L, 5R is reduced by the decrease in the steering angle. In this case, the steering angle fluctuates considerably in relation to the change in held steering torque as the curvature of the curve increases due to the steering reaction force characteristic in the above-described SBW system. In other words, there is a problem in that course correction is difficult because the sensitivity of the vehicle in relation to the steering torque increases as the curvature of the curve increases.

Figure 14:
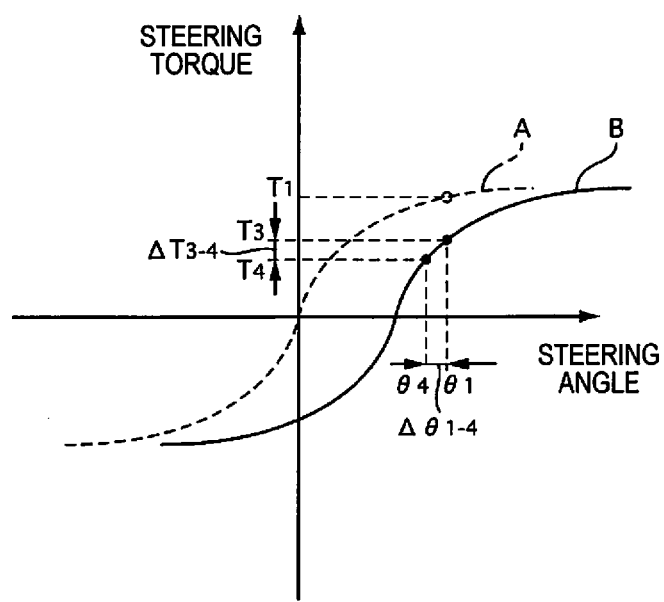
FIG. 14 is a diagram showing the state in which the characteristic showing the relationship between the steering angle of the steering wheel and the steering torque of the driver has changed due to the steering reaction force characteristic being offset in the same direction as the self-aligning torque, the steering reaction force characteristic representing the steering reaction force torque that corresponds to the self-aligning torque.

In contrast, the curvature based reaction force offset control of the first embodiment offsets, in the same sign direction as that of the self-aligning torque, the steering reaction force characteristic representing the steering reaction force torque that corresponds to the self-aligning torque in commensurate fashion to a greater curvature of the white line, whereby the characteristic that represents the relationship between the steering angle and the turning angle is offset in the same sign direction as the steering angle and changes from characteristic A to characteristic B, as shown in FIG. 14. Because the amount of change in the steering angle in relation to the amount of change in the held steering torque thereby decreases as the curvature of the white line increases, the reduction amount $\Delta\theta_{1-4}$ of the steering angle is less than that of a conventional reduction amount $\Delta\theta_{1-2}$, even when the driver reduces the held steering torque to $T_4$ and the reduction amount $\Delta T_{3-4}$ is the same as the conventional reduction amount $\Delta T_{1-2}$ shown in FIG. 13. In other words, because the fluctuation in the steering angle in relation to the change in held steering torque can be reduced in commensurate fashion of a higher curvature of the curve and the sensitivity of the vehicle in relation to the steering torque can be reduced, change in the behavior of the vehicle can be attenuated and it is possible to facilitate a course correction made by the driver. Also, because the held steering torque $T_3$ ($<T_1$) for maintaining the steering angle $\theta_1$ can be reduced more greatly than conventional techniques, it is possible to reduce the steering burden on the driver during cornering.

There is a conventionally known technique in which the trend in the steering reaction force characteristic is reduced as the curvature of the white line is increased for the purpose of reducing the steering burden of the driver during cornering. However, with this conventional technique, fluctuation of the steering angle in relation to the change in held steering torque is greater as the curvature increases, and the sensitivity of the vehicle in relation to the steering torque is therefore increased. In other words, offsetting the steering reaction force characteristic in the same direction as the self-aligning torque in accordance with the curvature of the white line makes it possible to both facilitate course correction and reduce the steering burden of the driver during cornering.

Steering Reaction Force Torque Offset Unit

Figure 15:
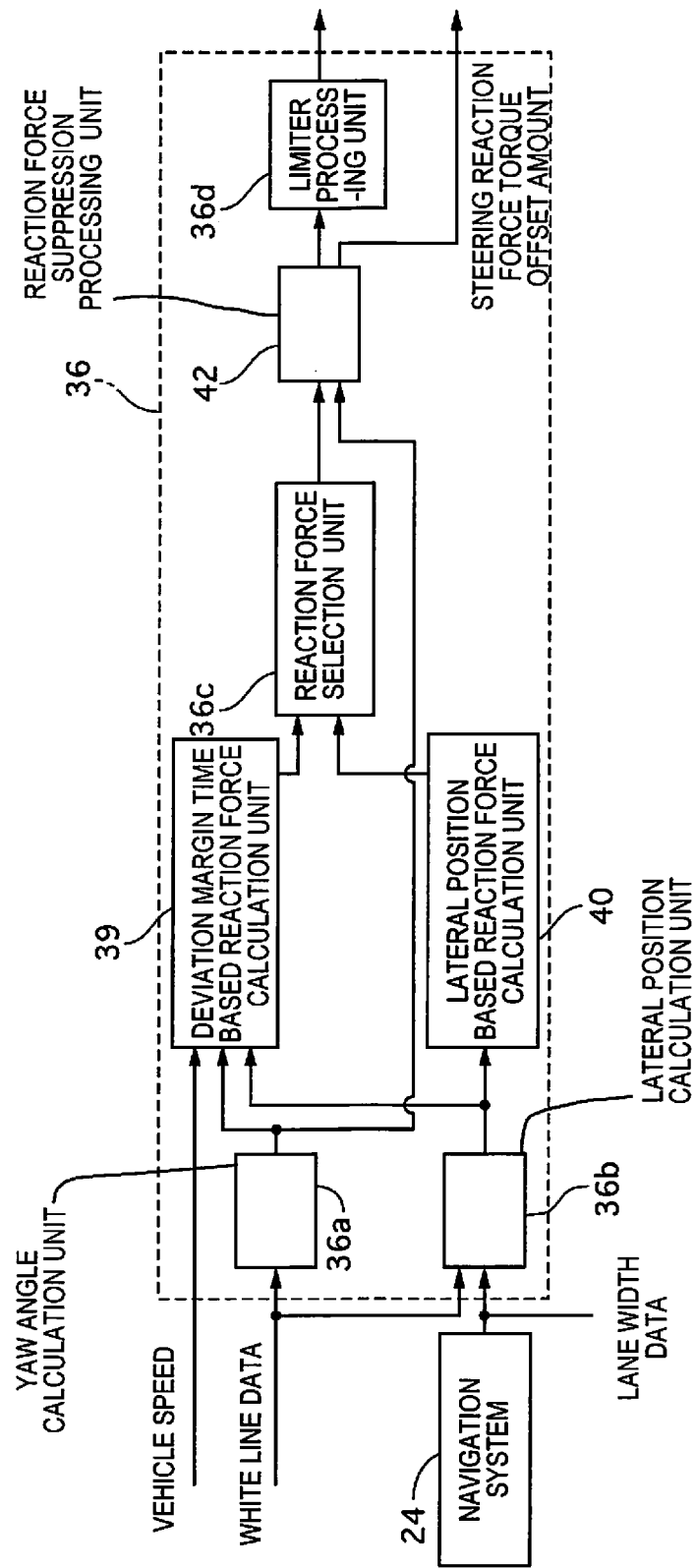
FIG. 15 is a control block diagram of the steering reaction force torque offset unit 36.

FIG. 15 is a control block view of the steering reaction force torque offset unit 36. A yaw angle calculation unit 36a computes the yaw angle at the forward fixation point. Computing the yaw angle based on an image of the travel path captured by the camera 17 allows the yaw angle to be detected in a simple manner with high precision. A lateral position calculation unit 36b computes the lateral position in relation to the left and right white lines at the forward fixation point and the lateral position to the left and right white lines at the current position. Here, the lateral position calculation unit 36b switches the lateral position in relation to the left and right white lines in the current position when the host vehicle has crossed the white line and moved to an adjacent travel lane, i.e., when a lane change has been carried out. In other words, the lateral position in relation to the left white line prior to arriving at the white line is used as the lateral position in relation to the right white line after arriving at the white line, and the lateral position in relation to the right white line prior to arriving at the white line is used as the lateral position in relation to the left white line after arriving at the white line. When a lane change has been made to a travel lane having a different lane width, the lane width $W_2$ of the travel lane after the lane change is multiplied by the lateral position switched for a value $W_2/W_1$ to correct the lateral position, the value $W_2/W_1$ being obtained by dividing the lane width $W_2$ of the travel lane after the lane change by the lane width $W_1$ of the travel lane prior to the lane change. Here, the lane width DATA of the travel lanes is acquired from a navigation system 24. A deviation margin time based reaction force calculation unit 39 computes a reaction force that corresponds to the deviation margin time based on the vehicle speed, the yaw angle, and the lateral position in relation to the left and right white lines at the forward fixation point. The details of the deviation margin time based reaction force calculation unit 39 are later described. A lateral position based reaction force calculation unit 40 computes a reaction force that corresponds to the lateral position based on the lateral position in relation to the left and right white lines at the current position. The specific details of the lateral position based reaction force calculation unit 40 are later described. A reaction force selection unit 36c selects, as the offset amount of the steering reaction force torque, the larger absolute value of the reaction force that corresponds to the deviation margin time and the reaction force that corresponds to the lateral position.

The reaction force suppression processing unit 42 calculates the reaction force suppression processing offset amount (suppression value) for reducing the steering reaction force torque offset amount with a constant slope when a state has continued for a predetermined length of time (e.g., 6 seconds) in which the steering reaction force torque offset amount (calculated value) outputted from the reaction force selection unit 36*c* is at a predetermined value or higher, and starts reaction force suppression processing for outputting the reaction force suppression processing offset amount in lieu of the calculated value as the steering reaction force torque offset amount to a later stage. The predetermined length of time is a value at which the driver senses the reaction force offset control that is based on the lateral position and the time to lane departure. In other words, the predetermined length of time is the friction value of the steering device. The reaction force suppression processing offset amount is held at a restoration threshold value when then reaction force suppression processing offset amount is less than a predetermined restoration threshold value. The predetermined restoration threshold value is smaller than the predetermined threshold value and is a value at which the driver does not sense that reaction force offset control is operating based on the lateral position and the time to lane departure. In other words, the predetermined restoration threshold value is less than the friction value of the steering device. When the calculated yaw angle in the yaw angle calculation unit 36*a* is less than a predetermined angle while the reaction force suppression processing offset amount is being held, the vehicle is assessed to be in a state of straight-line travel, the reaction force suppression processing is canceled, and the reaction force suppression processing offset amount for restoring the held value to the calculated value with a constant slope is calculated. The calculated value is directly outputted after the held value has been restored to the calculated value. The calculated value is outputted when the calculated value has become less than the suppression value during reaction force suppression processing. In other words, the steering reaction force torque offset amount is determined by selecting the lowest of the calculated value and the suppression value. The reaction force suppression processing is canceled when the calculated value has become less than the restoration threshold value during reaction force suppression processing, and in this case, simultaneously with this cancellation, a switch is made from outputting the suppression value to outputting the calculated value. The reaction force suppression processing unit 42 sets the reaction force suppression processing flag at the starting time point of the reaction force suppression processing, and resets the reaction force suppression processing flag at the cancellation time point of the reaction force suppression processing. When the reaction force suppression processing flag is in a reset state, the calculated value, i.e., the steering reaction force torque offset amount outputted from the reaction force selection unit 36*c*, is outputted, except for the case of restoration, with a constant slope from the suppression value to the calculated value. A limiter processing unit 36*d* limits the upper limit of the rate of change and the maximum value of the steering reaction force torque offset amount. For example, the maximum value is 2 Nm, and the upper limit of the rate of change is 10 Nm/s.

Figure 16:
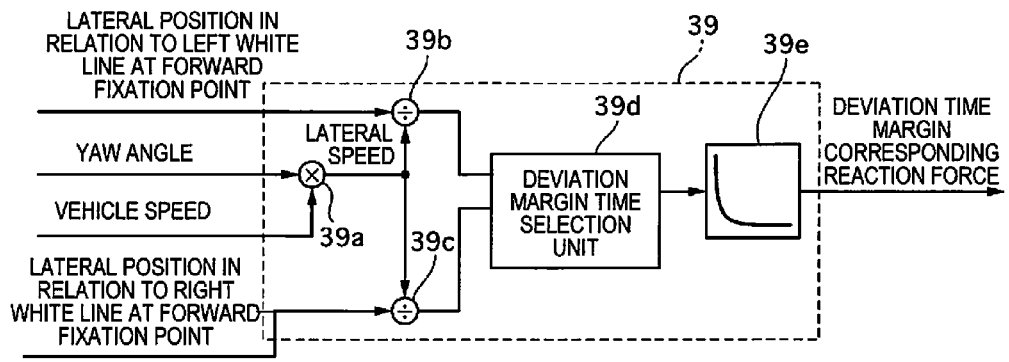
FIG. 16 is a control block diagram of the deviation margin time based reaction force calculation unit 39.

FIG. 16 is a control block view of the deviation margin time based reaction force calculation unit 39. A multiplier 39*a* multiplies the vehicle speed by the yaw angle to determine the lateral speed of the vehicle. A divider 39*b* divides the lateral position in relation to the left white line at a forward fixation point by the lateral speed to determine the deviation margin time in relation to the left white line. A divider 39*c* divides the lateral position in relation to the right white line at a forward fixation point by the lateral speed to determine the deviation margin time in relation to the right white line. A deviation margin time selection unit 39*d* selects the shorter deviation margin time in relation to the left and right white lines to be the deviation margin time. A deviation margin time based reaction force calculation unit 39*e* computes the reaction force that corresponds to the deviation margin time based on the deviation margin time. The reaction force that corresponds to the deviation margin time is inversely proportional (proportional to the reciprocal of the deviation margin time) to the deviation margin time, and is characteristic in being roughly zero at three seconds or more.

Figure 17:
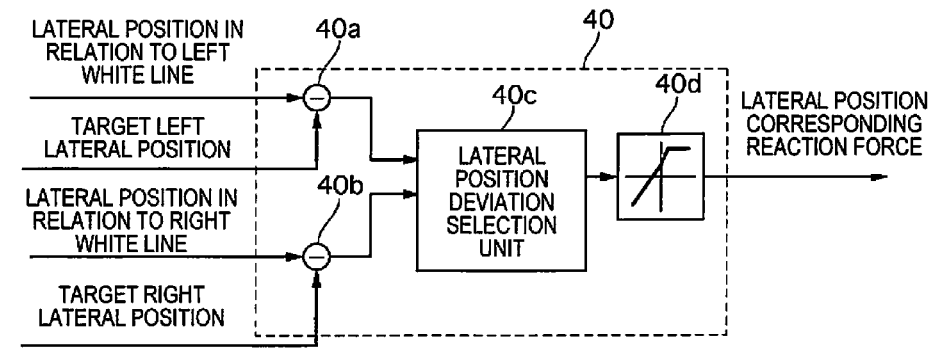
FIG. 17 is a control block diagram of the lateral position based reaction force calculation unit 40.

FIG. 17 is a control block view of the lateral position based reaction force calculation unit 40. A subtracter 40*a* subtracts the lateral position in relation to the left lane from a target left lateral position (e.g., 90 cm) set in advance to determine the lateral position deviation in relation to the left lane. A subtracter 40*b* subtracts the lateral position in relation to the right lane from a target right lateral position (e.g., 90 cm) set in advance to determine the lateral position deviation in relation to the right lane. A lateral position deviation selection unit 40*c* selects as the lateral position deviation the greater of the lateral position deviations in relation to the left and right lanes. A lateral position deviation based reaction force calculation unit 40*d* computes the reaction force that corresponds to the lateral position based on the lateral position deviation. The reaction force that corresponds to the lateral position sets the upper limit and is characteristic in being greater as the lateral position deviation is greater.

Effect of Lateral Position Based Reaction Force Offset Control

Figure 18:
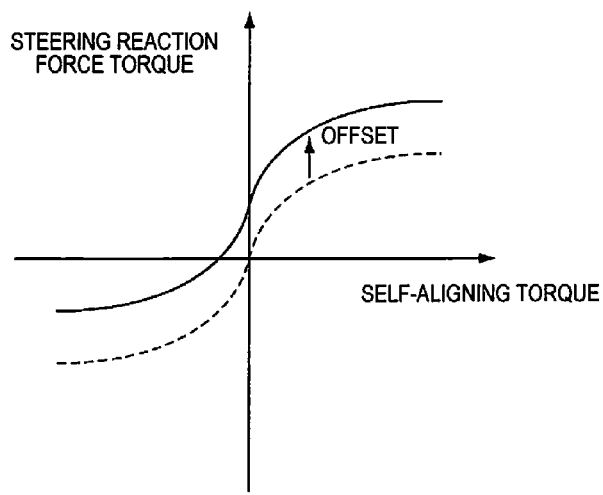
FIG. 18 is a diagram showing the state in which the steering reaction force characteristic representing the steering reaction force torque that corresponds to the self-aligning torque has been offset in the direction in which the absolute value of the steering reaction force torque increases.

Lateral position based reaction force offset control adds to the steering reaction force torque the reaction force that corresponds to the lateral position as the steering reaction force torque offset amount. The steering reaction force characteristic representing the steering reaction force torque that corresponds to the self-aligning torque is thereby offset more greatly in the direction in which the absolute value of the steering reaction force torque increases in commensurate fashion of a shorter distance to the white line, as shown in FIG. 18. FIG. 18 shows the case of proximity to the right lane, and the offset occurs in the direction opposite of that in FIG. 18 in the case of proximity to the left lane.

Figure 19:
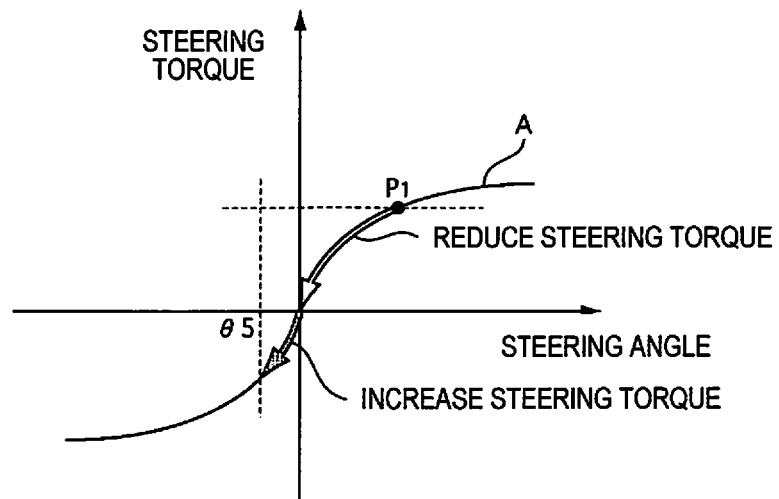
FIG. 19 is a characteristics diagram showing the relationship between the steering angle of the steering wheel and the steering torque of the driver.

Considered here in conventional steering reaction force control is the case in which the travel position of the vehicle is displaced to the right side due to an unexpected increased steering operation in the rightward direction by the driver, and the driver thereafter returns the travel position to the center vicinity of the travel lane using corrective steering. The steering angle and steering torque when the driver has carried out an unexpected operation is shown in the position of point $P_1$ on the characteristic A of FIG. 19. Characteristic A represents a relationship between the steering angle and the steering torque when a steering reaction force characteristic simulating a conventional steering device has been set. In order to return the travel position from this state to the center vicinity of the travel lane, the front wheels must be turned to the left, and therefore the driver, after having carried out a return operation to the steering angle neutral position, performs an increased steering operation from the steering angle neutral position to bring the steering wheel into alignment with a target angle $\theta_5$. At this point, in the above-described conventional technique, because the steering angle neutral position (zero point of the steering angle) and the steering torque neutral position (zero point of the steering torque) match each other, the steering torque must be reduced to the steering angle neutral position and the steering torque must be increased if the steering angle neutral position has been exceeded. In other words, when corrective steering for straddling the steering angle neutral position is carried out, the sign of the steering torque is inverted, the direction in which the driver controls force is switched, and the amount of change in the steering angle in relation to the amount of change in the steering torque in the vicinity of the steering torque neutral position is dramatically low in comparison with other steering angle regions. The steering burden on the driver is therefore high and it is difficult to bring the steering wheel to the target angle $\theta_5$. A problem is thereby created in which the travel position of the vehicle readily overshoots and thereby invites an increase in the amount of corrective steering.

Figure 20:
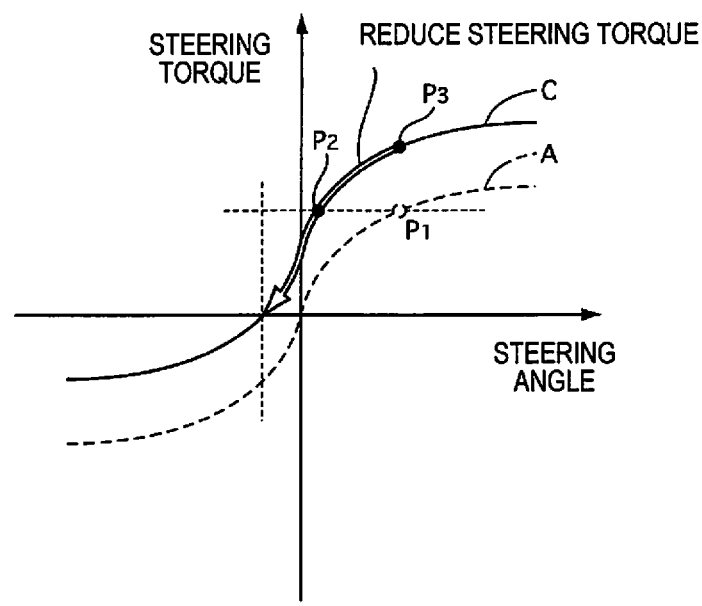
FIG. 20 is a diagram showing the state in which the characteristic showing the relationship between the steering angle of the steering wheel and the steering torque of the driver has changed due to the steering reaction force characteristic being offset in the direction in which the absolute value of the steering reaction force torque increases, the steering reaction force characteristic representing the steering reaction force torque that corresponds to the self-aligning torque.

In contrast, in the lateral position based reaction force offset control of the first embodiment, the steering reaction force torque that corresponds to the self-aligning torque is offset, in commensurate fashion to a shorter distance to the white line, in the direction in which the absolute value of the steering reaction force torque increases, whereby the characteristic representing the relationship between the steering angle and the turning angle is offset in the direction in which the absolute value of the steering torque increases, and the characteristic changes in continuous fashion from characteristic A to characteristic C in commensurate fashion to a shorter distance to the white line, as shown in FIG. 20. At this point, the steering torque must be increased in order to maintain the steering angle, and because the steering wheel 6 is gradually returned to the steering angle neutral position (point $P_1 \rightarrow$ point $P_2$) as long as the steering torque is constant, it is possible to suppress displacement of the travel position of the vehicle to the right side by an unexpected increased steering operation by the driver. On the other hand, when the driver has maintained the steering angle, the steering angle and the steering torque move from point $P_1$ to point $P_3$. When the driver performs corrective steering from this state, in characteristic C, the steering torque neutral position is offset to the increased steering side more greatly than to the steering angle neutral position, and the sign of the steering torque therefore does not invert until the steering torque arrives at the steering torque neutral position during increased steering operation from the steering angle neutral position. Consequently, the driver merely reduces the steering torque and stops rotating of the steering wheel 6 when the steering wheel 6 has reached a target angle to thereby control the turning angle of the front wheels 5L, 5R. In other words, in the lateral position based reaction force offset control in the first embodiment it is difficult to switch the direction in which the driver is controlling force, and corrective steering by the driver can therefore be facilitated. As a result, the travel position of the vehicle is not liable to overshoot and the amount of corrective steering can be reduced.

There it is a conventionally known technique to increase the steering reaction force in commensurate fashion in approach to the white line for the purpose of suppressing displacement of the travel position due to an unexpected operation by the driver, but in the conventional technique, the steering wheel is merely made more difficult to turn in commensurate fashion in approach to the white line, and because the steering torque neutral position in the steering reaction force characteristic constantly matches the steering angle neutral position, the sign of the steerage torque is inverted in corrective steerage which straddles the steerage angle neutral position, and the steering burden on the driver is not reduced. In other words, the steering reaction force torque that corresponds to the self-aligning torque is offset, in commensurate fashion to a shorter distance to the white line, in the direction in which the absolute value of the steering reaction force torque increases, thereby making it possible to implement both suppression of displacement of the travel position and reduction in the steering burden on the driver.

Also, in the lateral position based reaction force offset control of the first embodiment, the offset amount is increased as the distance to the white line is reduced, and the steering torque neutral position is therefore further offset toward a position away from the steering angle neutral position as the distance to the white line is reduced. When the driver carries out corrective steering for returning the travel position of the vehicle to the center vicinity of the travel lane, the increased steering amount from the steering angle neutral position must be increased in greater proximity to the white line. At this point, it is possible that the steering torque will exceed the neutral position and the sign of the steering torque will invert before the steering wheel reaches the target angle when the offset amount of the steering torque neutral position is low in relation to the steering angle neutral position. Consequently, increasing the offset amount as the distance to the white line is reduced makes it possible to suppress the steering torque from exceeding the neutral position.

In the lateral position based reaction force offset control of the first embodiment, the lateral position calculation unit 36b switches the lateral position in relation to the left and right white lines at the current position when the host vehicle has reached the white line. In lateral position based reaction force offset control, increasing the steering reaction force as the host vehicle moves away from the center vicinity of the travel lane makes it easier for the host vehicle to return to the center vicinity of the travel lane. In other words, the yaw angle integral value (change in the lateral position) is viewed as an external disturbance, and the steering reaction force is controlled so as to guide the vehicle in the direction that eliminates the yaw angle integral value. For this reason, the yaw angle integral value must be reset when a lane change is carried out. Were the yaw angle integral value not to be reset, operation by the driver would be obstructed because the steering reaction force for returning the vehicle to the center vicinity of the travel lane prior to the lane change would continue to have effect even after the lane change. Merely setting the integral value to zero does not allow the vehicle to be guided to the center vicinity of the travel lane after the lane change.

In view of the above, in the first embodiment, when the host vehicle has arrived at the white line, it is deemed to be an intentional operation by the driver, and the lateral position in relation to the left and right white lines in the current position is switched in such a case. In other words, inverting the sign of the yaw angle integral value switches the position for guiding the host vehicle from the center vicinity of the travel lane prior to the lane change to the center vicinity of the travel lane after the lane change, and allows the steering reaction force for guiding the host vehicle to the center vicinity of the travel lane after the lane change to be generated. At this point, consideration is given to the ratio $W_2/W_1$, which is the lane width $W_2$ of the travel lane after a lane change in relation to the lane width $W_1$ of the travel lane prior to a lane change, and it is therefore possible to set an accurate lateral position and to set an optimal offset amount for guiding the host vehicle to the center vicinity of the travel lane.

Effect of the Deviation Margin Time Based Reaction Force Offset Control]

Deviation margin time based reaction force offset control adds the deviation margin time based reaction force as the steering reaction force torque offset amount to the steering reaction force torque. The steering reaction force characteristic representing the steering reaction force torque that corresponds to the self-aligning torque is thereby offset in the direction in which the absolute value of the steering reaction force torque increases as the deviation margin time is reduced, as shown in FIG. 18. FIG. 18 shows the case of the host vehicle being near the right lane, and when the host vehicle is near the left lane, the offset occurs in the direction opposite of that in FIG. 18.

For this reason, the characteristic representing the relationship between the steering angle and the steering torque is offset in the direction in which the absolute value of the steering torque increases, and the characteristic changes in continuous fashion from characteristic A to characteristic C in commensurate fashion to a smaller deviation margin time, as shown in FIG. 20. At this point, the steering torque must be increased in order to maintain the steering angle, and because the steering wheel 6 is gradually returned to the steering angle neutral position (point $P_1 \rightarrow$ point $P_2$) as long as the steering torque is constant, it is possible to suppress displacement of the travel position of the vehicle to the right side by an unexpected increased steering operation by the driver. On the other hand, when the driver has maintained the steering angle, the steering angle and the steering torque move from point $P_1$ to point $P_3$. When the driver performs corrective steering from this state, in characteristic C, the steering torque neutral position is offset to the increased steering side more greatly than to the steering angle neutral position, and the sign of the steering torque therefore does not invert until the steering torque arrives at the steering torque neutral position during increased steering operation from the steering angle neutral position. Consequently, the driver merely reduces the steering torque and stops rotation of the steering wheel 6 when the steering wheel 6 has reached a target angle to thereby control turning angle of the front wheels 5L, 5R. In other words, in the deviation margin time based reaction force offset control in the first embodiment, it is difficult to switch the direction in which the driver is controlling force, and corrective steering by the driver can therefore be facilitated. As a result, the travel position of the vehicle is not liable to overshoot and the amount of corrective steering can be reduced.

Also, in the deviation margin time based reaction force offset control of the first embodiment, the offset amount is increased as the deviation margin time decreases, and the steering torque neutral position is therefore further offset toward a position away from the steering angle neutral position as the deviation margin time decreases. When the driver carries out corrective steering for returning the travel position of the vehicle to the center vicinity of the travel lane, the possibility that the host vehicle is near the white line increases as the deviation margin time decreases, and the increased steering operation amount from the steering angle neutral position must be increased in commensurate fashion in proximity to the white line. At this point, it is possible that the steering torque will exceed the neutral position and the sign of the steering torque will invert before the steering wheel reaches the target angle when the offset amount of the steering torque neutral position is low in relation to the steering angle neutral position. Consequently, increasing the offset amount as the distance to the white line is reduced makes it possible to suppress the steering torque from exceeding the neutral position.

Combined Effect of the Lateral Position and Deviation Margin Time Based Reaction Force Offset Controls In the steering reaction force control unit 20, the greater of the absolute values of the deviation margin time based reaction force and the lateral position based reaction force is selected as the steering reaction force offset amount in the steering reaction force torque offset unit 36, and the steering reaction force offset amount is added to the steering reaction force torque in the adder 20c. The deviation margin time or the lateral position based steering reaction force characteristic is offset in the direction in which the absolute value of the steering reaction force torque increases. In the deviation margin time based reaction force offset control, the deviation margin time based reaction force is zero when the host vehicle and the white line are parallel, i.e., when the yaw angle is zero. For this reason, only a small amount of reaction force is applied when the yaw angle is low, even when the host vehicle is in a position near the white line. In contrast, in lateral position based reaction force offset control, the reaction force (the reaction force that corresponds to the lateral position) is generated in proportion to the distance to the white line, and a greater reaction force can therefore be produced in commensurate fashion to a shorter distance to the white line, and the host vehicle can be readily returned to the center vicinity of the travel lane.

On the other hand, in lateral position based reaction force offset control, the reaction force that corresponds to the lateral position is zero when the host vehicle is in the center vicinity of the travel lane. Accordingly, it is difficult to increase the steering reaction force with good responsiveness in relation to arriving at the white line in a short period of time when the yaw angle is great and the vehicle speed is furthermore high, even in the center vicinity of the travel lane. In contrast, in deviation margin time based reaction force offset control, a reaction force (deviation margin time based reaction force) that corresponds to the deviation margin time is generated and said reaction force is characteristic in rapidly rising when the deviation margin time is three seconds or less. Therefore, the steering reaction force can be increased with good responsiveness, and lane deviation can be suppressed even when there is a short period of time to arrival at the white line. Consequently, using the deviation margin time based reaction force offset control and the lateral position based reaction force offset control in combination makes it possible to impart a stable reaction force in accordance with the distance to the white line and to effectively suppress lane deviation. At this point, using the larger of the absolute values of the deviation margin time based reaction force and the lateral position based reaction force makes it possible to constantly impart a required steering reaction force in an optimal manner.

Drive Assist Stop Operation

Figure 21:
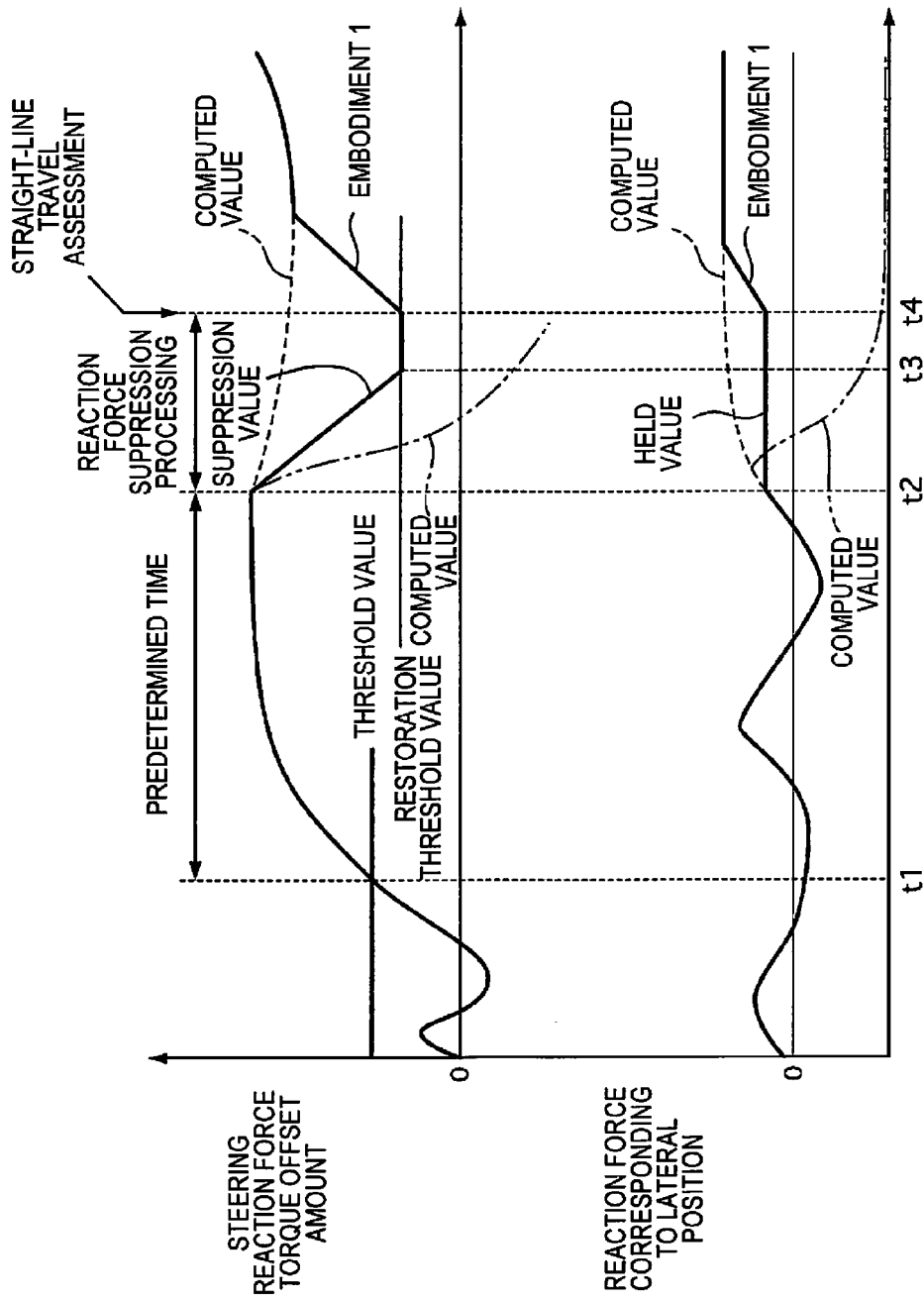
FIG. 21 is a timing chart of the steering reaction force torque offset amount and the reaction force corresponding to the lateral position when a state in which the steering reaction force torque offset amount is at a threshold value or higher has continued for a predetermined length of time.

FIG. 21 is a timing chart of the steering reaction force torque offset amount and the reaction force corresponding to the lateral position when a state in which the steering reaction force torque offset amount is at a threshold value or higher has continued for a predetermined length of time. At time t1, the steering reaction force torque offset amount conforms to the threshold value. A time t2, the reaction force suppression processing starts because a predetermined length of time has elapsed with the steering reaction force torque offset amount exceeding the threshold value. In the interval from time t2 to t3, the steering reaction force torque offset amount is reduced with a constant slope. Meanwhile, the lateral position based reaction force holds the calculated value at the time point of the start of reaction force suppression processing. At this time, when the calculated value of the steering reaction force torque offset amount has become less than the suppression value, the steering reaction force torque offset amount follows the calculated value, as indicated by the two-dot chain line. The same applies to the lateral position based reaction force. At time t3, the steering reaction force torque offset amount has become less than the restoration threshold value, and the steering reaction force torque offset amount is therefore held at the restoration threshold value. In the interval from time t3 to t4, the steering reaction force torque offset amount and the lateral position based reaction force are invariable. At time t4, the reaction force suppression processing is canceled by assessment of straight-line travel based on the yaw angle. At time t4 and thereafter, the steering reaction force torque offset amount and the lateral position based reaction force are increased with a constant slope and are thereby restored to the lateral position based calculated value, and control then returns to normal control.

In the first embodiment, lane departure is suppressed by two forms of reaction force control (lateral position based reaction force offset control and time-to-lane-departure based reaction force offset control) and one form of turning control (lateral position F/B control) to perform drive assist for the driver. Although consecutive instances of white-line based drive assist will reduce driver fatigue, there is a drawback in that the driver may rely excessively on drive assist as if automated driving is being carried out when drive assist is continued over a long period of time, and awareness to driving may be reduced. In contrast, in the first embodiment, reaction force suppression processing for reducing the steering reaction force torque offset amount is carried out when a state in which the steering reaction force torque offset amount is at a threshold value or greater has continued for a predetermined length of time (6 seconds). Since the driver can thereby be made aware that lateral position based drive assist has stopped by the reduction of steering reaction force, excessive reliance on drive assist by the driver can be suppressed, and the awareness of the driver to driving can be increased. Since there is no direct effect on vehicle behavior even if the steering reaction force is reduced, the vehicle is not liable to depart from the white lines. Also, the steering reaction force torque offset amount is gradually reduced, and therefore the unpleasant sensation imparted to the driver due to diminished reaction force can be reduced. Since the steering reaction force torque offset amount is reduced to a restoration threshold value at which the driver does not sense control, it is possible to reliably cause the driver to be aware that drive assist has been stopped. Calculation of the lateral position based steering reaction force torque offset amount is continued even during reaction force suppression processing, and it is therefore possible to suppress the occurrence of control response delay when a transition is made to lateral position based normal control.

In the first embodiment, the reaction force suppression processing is canceled when a state of straight-line travel has been assessed during the reaction force suppression processing. Returning the steering reaction force torque offset amount and the lateral position based reaction force to a normal value (calculated value) when the vehicle travel direction and the white line orientation match makes it possible to transition to normal control after the vehicle has reached a stable state, and it is therefore possible to suppress instability in vehicle behavior when a transition is made from reaction force suppression processing to normal control. In the first embodiment, the steering reaction force torque offset amount follows the calculated value (the two-dot chain line of the steering reaction force torque offset amount in FIG. 21) when the calculated value of the steering reaction force torque offset amount has become less than the suppression value during reaction force suppression processing. Were a suppression value to be selected when the calculated value has become less than the suppression value, the actual steering reaction force would be excessive in relation to the steering reaction force that originally should be outputted, and the driver would experience an unpleasant sensation. Consequently, following the calculated value in this case makes it possible to reduce the unpleasant sensation imparted to the driver. The same applies to the lateral position based reaction force, and when the calculated value of the lateral position based reaction force has become less than the held value during reaction force suppression processing, the lateral position based reaction force is caused to follow the calculated value (the two-dot chain line of the lateral position based reaction force in FIG. 21). It is thereby possible to suppress the external disturbance suppression command turning angle from becoming excessively great in relation to the external disturbance suppression command turning angle that should originally be outputted, the unpleasant sensation imparted to the driver can be reduced, and disturbance in vehicle behavior can be suppressed. In the first embodiment, the lateral position based reaction force is maintained at the value at the starting time point of the reaction force suppression processing when a state in which the steering reaction force torque offset amount is at a threshold value or greater has continued for a predetermined length of time (6 seconds) in the reaction force suppression processing. Were the lateral position based reaction force to be reduced, the vehicle is liable to depart from the white line. On the other hand, it becomes more difficult to cause the driver to be aware that the drive assist has stopped when the lateral position based reaction force is increased. Consequently, maintaining the lateral position based reaction force makes it possible to cause the driver to be aware that the drive assist has stopped while also suppressing lane departure.

As described above, the first embodiment has the following listed effects.

(1) A steering control device comprises: a reaction force motor (steering reaction force actuator) 8 for imparting steering reaction force to a steering unit 1; a steering reaction force torque offset unit (steering reaction force control amount calculation means) 36 for computing a steering reaction force torque offset amount (steering reaction force control amount) in which a steering reaction force increases in the direction in which the lateral position of a host vehicle moves away from the white line in commensurate proximity to the white line; an electric current driver (steering reaction force control means) 23 for controlling the reaction force motor 8 based on the steering reaction force torque offset amount; a turning motor (turning actuator) 13 for imparting turning torque to a turning part 2 mechanically separated from the steering unit 1; a lateral position based reaction force calculation unit (turning control amount calculation means) 38 for computing a lateral position based reaction force (turning control amount) in which a turning amount increases in the direction in which the lateral position of the host vehicle moves away from the white line in commensurate proximity to the white line; a electric current driver (turning control means) 22 for controlling the turning motor 13 based on the lateral position based reaction force; a reaction force suppression processing unit (reaction force suppression processing means) 42 for computing a reaction force suppression processing offset amount (steering reaction force control amount of reaction force suppression processing) for reducing the steering reaction force torque offset amount when a state in which the steering reaction force torque offset amount has been at a predetermined threshold value or higher for a predetermined length of time, and for processing reaction force suppression for controlling the reaction force motor 8 based on the reaction force suppression processing offset amount in lieu of the steering reaction force torque offset amount; and a lateral position based reaction force holding unit (turning amount holding means) 41 for holding the lateral position based reaction force at the value occurring at the starting time point of the reaction force suppression processing when the reaction force suppression processing has started. The driver can thereby be made aware that lateral position based driver assist has stopped by a reduction in the steering reaction force, and it is therefore possible suppress over reliance on driver assist by the driver. As a result, it is possible to increase the attention of the driver on driving while suppressing lane departure.

(2) The reaction force suppression processing unit 42 holds the reaction force suppression processing offset amount at a predetermined restoration threshold value when the reaction force suppression processing offset amount has decreased to the restoration threshold value. It is thereby possible to cause the driver to be aware that the drive assist has stopped without stopping control, and it is possible suppress the occurrence of response delay when a transition is made to normal control.

(3) Yaw angle calculation unit (straight-line travel assessment means) 36a for assessing the straight-line travel state of the vehicle is provided, where the reaction force suppression processing unit 42 cancels the reaction force suppression processing when travel is assessed to be straight-line travel while the reaction force suppression processing offset amount is being held, and restores the reaction force suppression processing offset amount to the steering reaction force torque offset amount. It is thereby possible to transition to normal control after the vehicle has reached a stable state, and it is therefore possible to suppress instability in vehicle behavior when a transition is made from reaction force suppression processing to normal control.

(4) The reaction force suppression processing unit 42 imparts the steering reaction force torque offset amount to the reaction force motor 8 when the steering reaction force torque offset amount has become less than the reaction force suppression processing during reaction force suppression processing. It is thereby possible to suppress imparting an excessive steering reaction force in relation to the steering reaction force that originally should be outputted, and the unpleasant sensation imparted to the driver can be reduced.

(5) The lateral position based reaction force holding unit 41 restores the lateral position based reaction force being held to the lateral position based reaction force computed by the lateral position based reaction force calculation unit 38 when the reaction force suppression processing has been canceled. It is thereby possible to transition to normal control after the vehicle has reached a stable state, and it is therefore possible to suppress instability in vehicle behavior when a transition is made from reaction force suppression processing to normal control.

(6) The lateral position based reaction force holding unit 41 imparts the lateral position based reaction force to the turning motor 13 when the lateral position based reaction force computed by the lateral position based reaction force calculation unit 38 has become less than the value occurring at the time point of the start of reaction force suppression processing after the reaction force suppression processing has started. It is thereby possible to suppress the external disturbance suppression command turning angle from becoming excessively great in relation to the external disturbance suppression command turning angle that should originally be outputted, and it is possible to suppress the unpleasant sensation imparted to the driver and disturbance in vehicle behavior.

The invention claimed is:

1. A steering control device comprising:
a steering reaction force actuator configured to impart a steering reaction force to a steering unit;
a steering reaction force control amount calculation unit that computes a steering reaction force control amount in which a steering reaction force increases in a direction in which a lateral position of a host vehicle moves away from a travel path partition line in commensurate proximity to the travel path partition line;
a steering reaction force control unit that controls the steering reaction force actuator based on the steering reaction force control amount;
a turning actuator for imparting turning torque to a turning part mechanically separated from the steering unit;
a turning control amount calculation unit that computes a turning control amount in which a turning amount increases in the direction in which the lateral position of the host vehicle moves away from the travel path partition line in commensurate proximity to the travel path partition line;
a turning control unit that controls the turning actuator based on the turning control amount;
a reaction force suppression processing unit that computes a steering reaction force control amount of reaction force suppression processing for reducing the steering reaction force control amount when a state in which the steering reaction force control amount has been at a predetermined threshold value or higher for a predetermined length of time, and that conducts a reaction force suppression processing to control the steering reaction force actuator based on the steering reaction force control amount of reaction force suppression processing in lieu of the steering reaction force control amount; and
a turning amount holding unit that holds the turning control amount at a value occurring at a starting time point of the reaction force suppression processing when the reaction force suppression processing has started.

2. The steering control device according to claim 1, wherein
the reaction force suppression processing unit holds the steering reaction force control amount of reaction force suppression processing at a predetermined restoration threshold value when the steering reaction force control amount for reaction force processing has decreased to the predetermined restoration threshold value.

3. The steering control device according to claim 2, further comprising
a straight-line travel assessment unit that assesses a straight-line travel state of the vehicle, where the reaction force suppression processing unit cancels the reaction force suppression processing when travel is assessed to be straight-line travel while the steering reaction force control amount for reaction force processing is being held, and restores the steering reaction force control amount for reaction force processing to the steering reaction force control amount.

4. The steering control device according to claim 2, wherein
the reaction force suppression processing unit imparts the steering reaction force control amount to the steering reaction force actuator when the steering reaction force control amount has become less than the steering reaction force control amount for reaction force processing during the reaction force suppression processing.

5. The steering control device according to claim 2, wherein
when the reaction force suppression processing has been canceled, the turning amount holding unit restores the turning control amount being held to the turning control amount computed by the turning control amount calculation unit.

6. The steering control device according to claim 2, wherein
the turning amount holding unit imparts the turning control amount to the turning actuator when the turning control amount computed by the turning control amount calculation unit has become less than the value occurring at a time point of a start of the reaction force suppression processing after the reaction force suppression processing has started.

7. The steering control device according to claim 3, wherein
the reaction force suppression processing unit imparts the steering reaction force control amount to the steering reaction force actuator when the steering reaction force control amount has become less than the steering reaction force control amount for reaction force processing during the reaction force suppression processing.

8. The steering control device according to claim 3, wherein
when the reaction force suppression processing has been canceled, the turning amount holding unit restores the turning control amount being held to the turning control amount computed by the turning control amount calculation unit.

9. The steering control device according to claim 3, wherein
the turning amount holding unit imparts the turning control amount to the turning actuator when the turning control amount computed by the turning control amount calculation unit has become less than the value occurring at a time point of a start of the reaction force suppression processing after the reaction force suppression processing has started.

10. The steering control device according to claim 1, wherein
the reaction force suppression processing unit imparts the steering reaction force control amount to the steering reaction force actuator when the steering reaction force control amount has become less than the steering reaction force control amount for reaction force processing during the reaction force suppression processing.

11. The steering control device according to claim 10, wherein
when the reaction force suppression processing has been canceled, the turning amount holding unit restores the turning control amount being held to the turning control amount computed by the turning control amount calculation unit.

12. The steering control device according to claim 10, wherein
the turning amount holding unit imparts the turning control amount to the turning actuator when the turning control amount computed by the turning control amount calculation unit has become less than the value occurring at a time point of a start of the reaction force suppression processing after the reaction force suppression processing has started.

13. The steering control device according to claim 1, wherein
when the reaction force suppression processing has been canceled, the turning amount holding unit restores the turning control amount being held to the turning control amount computed by the turning control amount calculation unit.

14. The steering control device according to claim 13, wherein
the turning amount holding unit imparts the turning control amount to the turning actuator when the turning control amount computed by the turning control amount calculation unit has become less than the value occurring at a time point of a start of the reaction force suppression processing after the reaction force suppression processing has started.

15. The steering control device according to claim 1, wherein
the turning amount holding unit imparts the turning control amount to the turning actuator when the turning control amount computed by the turning control amount calculation unit has become less than the value occurring at a time point of a start of the reaction force suppression processing after the reaction force suppression processing has started.

* * * * *